(12) United States Patent
Kato et al.

(10) Patent No.: US 10,403,900 B2
(45) Date of Patent: Sep. 3, 2019

(54) METHOD FOR PRODUCING POROUS GRAPHITE, AND POROUS GRAPHITE

(71) Applicants: TOHOKU TECHNO ARCH CO., LTD., Sendai-shi, Miyagi (JP); TPR INDUSTRY CO., LTD., Sagae-shi, Yamagata (JP)

(72) Inventors: Hidemi Kato, Sendai (JP); Seung-Geun Yu, Sendai (JP); Takeshi Wada, Sendai (JP)

(73) Assignees: TOHOKU TECHNO ARCH CO., LTD., Sendai-shi (JP); TPR INDUSTRY CO., LTD, Sagae-shi (JP)

( * ) Notice: Subject to any disclaimer, the term of this patent is extended or adjusted under 35 U.S.C. 154(b) by 170 days.

(21) Appl. No.: 15/501,553

(22) PCT Filed: Sep. 4, 2015

(86) PCT No.: PCT/JP2015/075213
§ 371 (c)(1),
(2) Date: Feb. 3, 2017

(87) PCT Pub. No.: WO2016/039268
PCT Pub. Date: Mar. 17, 2016

(65) Prior Publication Data
US 2017/0225955 A1    Aug. 10, 2017

(30) Foreign Application Priority Data

Sep. 9, 2014 (JP) ................................. 2014-183619
Jul. 17, 2015 (JP) ................................. 2015-143437

(51) Int. Cl.
*H01M 10/0525*    (2010.01)
*H01M 4/66*    (2006.01)
(Continued)

(52) U.S. Cl.
CPC ............. *H01M 4/663* (2013.01); *C01B 32/20* (2017.08); *C01B 32/30* (2017.08); *C01B 32/336* (2017.08);
(Continued)

(58) Field of Classification Search
CPC ........................ H01M 10/052; H01M 10/0525
See application file for complete search history.

(56) References Cited

U.S. PATENT DOCUMENTS 5,096,560 A    3/1992  Takai et al.
9,279,186 B2   3/2016  Kato et al.
(Continued)

FOREIGN PATENT DOCUMENTS

EP    0350989 A1    1/1990
JP    S58-140379 A    8/1983
(Continued)

OTHER PUBLICATIONS

Jun. 14, 2018 Office Action issued in European Patent Application No. 15839941.0.
(Continued)

*Primary Examiner* — Olatunji A Godo
(74) *Attorney, Agent, or Firm* — Oliff PLC

(57) ABSTRACT

A method for producing porous graphite capable of realizing higher durability, output and capacity, and porous graphite. A carbon member having microvoids is obtained by a dealloying step for selectively eluting other non-carbon main components into a metal bath by immersing a carbon-containing material, composed of a compound including carbon or an alloy or non-equilibrium alloy, in the metal bath, wherein the metal bath has a solidifying point lower than the melting point of the carbon-containing material, and is controlled to a temperature lower than the minimum value of a liquidus temperature within a composition fluctuation (Continued)

range extending from the carbon-containing material to carbon by reducing the other non-carbon main components. The carbon member obtained in the dealloying step is graphitized by heating in a graphitization step. The carbon member graphitized in the graphitization step is subjected to activation treatment by an activation step.

12 Claims, 20 Drawing Sheets

(51) Int. Cl.
  *H01M 4/587*  (2010.01)
  *H01M 4/88*  (2006.01)
  *C01B 32/20*  (2017.01)
  *C01B 32/336*  (2017.01)
  *C01B 32/348*  (2017.01)
  *C01B 32/30*  (2017.01)

(52) U.S. Cl.
  CPC .......... *C01B 32/348* (2017.08); *H01M 4/587* (2013.01); *H01M 4/8807* (2013.01); *C01P 2002/74* (2013.01); *C01P 2004/02* (2013.01); *C01P 2004/04* (2013.01); *C01P 2006/12* (2013.01); *C01P 2006/14* (2013.01); *C01P 2006/16* (2013.01); *C01P 2006/40* (2013.01)

(56) References Cited

U.S. PATENT DOCUMENTS

2012/0295129 A1 11/2012 Kato et al.
2014/0232031 A1* 8/2014 Neumann ............. H01M 4/366
                   264/29.1

FOREIGN PATENT DOCUMENTS

| | | |
|---|---|---|
| JP | S60-152569 A | 8/1985 |
| JP | H03-2553 A | 1/1991 |
| JP | H10-294101 A | 11/1998 |
| JP | 2004-359518 A | 12/2004 |
| JP | 4762424 B2 | 8/2011 |
| JP | 2012-158487 A | 8/2012 |
| WO | 2004/099073 A2 | 11/2004 |
| WO | 2011/092909 A1 | 8/2011 |
| WO | WO2013053679 * | 4/2013 |
| WO | 2013/174536 A1 | 11/2013 |

OTHER PUBLICATIONS

Hasegawa et al., "Fabrication of activated carbons with well-defined macropores derived from sulfonated poly (divinylbenzene) networks," Carbon, 2010, vol. 48, pp. 1757-1766.

Tonanon et al., "3D interconnected macroporous carbon monoliths prepared by ultrasonic irradiation," Carbon, 2005, vol. 43, pp. 2808-2811.

Nov. 10, 2015 International Search Report issued in International Patent Application No. PCT/JP2015/075213.

Jun. 2, 2017 Extended Search Report issued in European Patent Application No. 15839941.0.

Lei Zhang et al. "A New Route for Preparation of Titanium Carbide Derived Carbon and Its Performance for Supercapacitors". Materials Letters, vol. 122, Feb. 8, 2014, pp. 78-81.

N. M. Haimour et al. "Utilization of Date Stones for Production of Activated Carbon Using Phosphoric Acid". Waste Management, Elsevier, New York, NY, vol. 26, No. 6, Jan. 1, 2006, pp. 651-660.

* cited by examiner (a) Before treatment        (b) After treatment (a)

(b)

METHOD FOR PRODUCING POROUS GRAPHITE, AND POROUS GRAPHITE

BACKGROUND OF THE INVENTION

Field of the Invention

The present invention relates to a method for producing porous graphite and porous graphite.

Description of the Related Art

Carbon materials such as activated carbon have conventionally been used in the electrodes of various types of batteries and the like by utilizing their high reaction efficiency attributable to their extremely large surface area (see, for example, Patent Document 1). In terms of the performance of electrodes and the like in which carbon materials are used, the negative electrode active material of a lithium ion battery, for example, is required to demonstrate high output, high charge/discharge rate and high capacitor, the electrode catalyst support of a fuel cell is required to demonstrate high output and high durability, while the polarizable electrode of an electric double-layer capacity is required to demonstrate high output and high capacity.

Carbon materials such as activated carbon, carbon black, graphene or carbon nanotubes are used in the electrode catalyst supports, for example, of electrodes and fuel cells. However, since activated carbon and carbon black have low crystallinity and a large number of contact points, they demonstrate high electrical resistance and low electrical conductivity, thereby resulting in the occurrence of the problems of decreased output density and charge/discharge rate due to the occurrence of voltage drops within an electrode. In addition, due to the low crystallinity, there were also problems in terms of decreased corrosion resistance and durability. In addition, although graphene and clusters of carbon nanotubes demonstrate high electrical conductivity and a large specific surface area, due to their small bulk density, the amount of carbon per se that contributes to a battery reaction decreases, resulting in the problem of being unable to generate absolute capacity of a battery.

In order to solve such problems, porous carbon obtained by carrying out sulfonation treatment and carbonization treatment (see, for example, Non-Patent Document 1), and porous carbon obtained by using ultrasonic irradiation and an RF solution having a low catalyst concentration (see, for example, Non-Patent Document 2), have been developed. Since these porous carbons have a large bulk density in bulk and are able to enhance electrical conductivity, they are able to realize comparatively high output and capacity.

Furthermore, a so-called Liquid metal dealloying method was developed by the inventors of the present invention that allows the production of metal members having micropores throughout or in the surface thereof (see, for example, Patent Document 2).

PRIOR ART DOCUMENTS

Patent Documents

[Patent Document 1] Japanese Patent No. 4762424
[Patent Document 2] International Publication No. WO 2011/092909

Non-Patent Documents

[Non-Patent Document 1] G. Hasegawa et al., "Fabrication of activated carbons with well-defined macropores derived from sulfonated poly(divinylbenzene) networks", Carbon, 2010, 48, p. 1757-1766
[Non-Patent Document 2] N. Tonanon et al., "3D interconnected macroporous carbon monoliths prepared by ultrasonic irradiation", Carbon, 2005, 43, p. 2808-2811

SUMMARY OF THE INVENTION

Problems to be Solved by the Invention

In the porous carbons described in Non-Patent Documents 1 and 2, since the crystallinity thereof is somewhat low and specific surface area is not that large, there was the shortcoming of still having room for improvement in the areas of durability, output and capacity. For example, in an electrode catalyst support of a fuel cell and the like, higher levels of performance are required than the output and capacity able to be obtained with the porous carbons described in Non-Patent Documents 1 and 2, thereby demonstrating the desire for the development of a carbon material having higher durability, output and capacity.

With the foregoing in view, an object of the present invention is to provide a method for producing porous graphite capable of realizing higher durability, output and capacity, and such porous graphite.

Means for Solving the Problems

In order to achieve the aforementioned object, the method for producing porous graphite according to the present invention is characterized by having a dealloying step for obtaining a carbon member having microvoids by selectively eluting other non-carbon main components into a molten metal by contacting a carbon-containing material composed of a compound, containing carbon or an alloy or non-equilibrium alloy, with the molten metal, the molten metal having a solidifying point lower than the melting point of this carbon-containing material, and controlled to a temperature lower than the minimum value of a liquidus temperature within a composition fluctuation range extending from the carbon-containing material to carbon by reducing the other non-carbon main components; and, an activation step for subjecting the carbon member obtained in the dealloying step to an activation treatment.

In the method for producing porous graphite according to the present invention, residual carbon undergoes repeated mutual bonding to form particles on the nanometer scale by selectively eluting other non-carbon main components into a molten metal from the carbon-containing material in the dealloying step. Moreover, since these particles are partially bonded, a porous, bulk carbon member can be obtained that has microvoids such as mesopores (diameter of 2 nm to 60 nm) or macropores (diameter of 60 nm or more). Furthermore, the void size and void ratio of the produced carbon member can be changed by changing the temperature of the molten metal, the contact time between the carbon-containing material and the molten metal, and the carbon component ratio in the carbon-containing material.

In addition, in the method for producing porous graphite according to the present invention, in the case the carbon member obtained in the dealloying step is already adequately graphitized, an infinite number of micropores (diameter of 2 nm or less) can be formed in the surface of the carbon member and specific surface area can be increased by subjecting the carbon member to an activation treatment in the activation step. Furthermore, any method may be used for the activation treatment provided it allows the formation of micropores in the carbon member, and examples thereof include gas activation using carbon dioxide, water vapor or air, and chemical activation using zinc chloride, sulfate or phosphoric acid.

In this manner, according to the method for producing porous graphite according to the present invention, porous graphite can be obtained that demonstrates high crystallinity, electrical conductivity and durability, has a high specific surface area, and exhibits high bulk density in bulk form. In the case of using in an electrode of various types of batteries and the like, since the resulting porous graphite is composed of mesopores and macropores, its properties demonstrate high thermal stability, and due to the large specific surface area thereof, allows the obtaining of a high charge/discharge rate and high output. In addition, due to the high levels of crystallinity and electrical conductivity, high output, high charge/discharge rate and high durability can be obtained. In addition, the large bulk density makes it possible to demonstrate high capacity.

The method for producing porous graphite according to the present invention has a graphitization step for graphitizing the carbon member obtained in the dealloying step by heating, and activation treatment of the activation step may be carried out on the aforementioned carbon member following graphitization thereof in the aforementioned graphitization step. In this case, when the carbon member obtained in the dealloying step has not been adequately graphitized, graphitization of that carbon member in the graphitization step makes it possible to enhance crystallinity, lower electrical resistivity and enhance electrical conductivity. In addition, durability can also be enhanced. Furthermore, a porous structure can be maintained in the graphitization step without disappearing most of mesopores and macropores.

In the method for producing porous graphite according to the present invention, any method may be used to contact the carbon-containing material with the molten metal provided other non-carbon main components of the carbon-containing material can be eluted into the molten metal. For example, in the aforementioned dealloying step, by immersing the carbon-containing material in a metal bath composed of the aforementioned molten metal, the aforementioned other non-carbon main components are made to selectively elute into the metal bath to obtain the aforementioned carbon member. In addition, by having a pretreatment step, in which a solid metal having a solidifying point lower than the melting point of the carbon-containing material is preliminarily contacted with the carbon-containing material, and heating the solid metal to obtain the aforementioned molten metal in the aforementioned dealloying step, the other non-carbon main components may be selectively made to elute into the molten metal and obtain the carbon member.

In the method for producing porous graphite according to the present invention, the aforementioned dealloying step preferably selectively elutes and removes only an adhesive mixture containing components of the aforementioned molten metal and/or the aforementioned other main components that have adhered to the periphery or inside the aforementioned microvoids by using an acidic or alkaline aqueous solution after having separated the carbon member from the molten metal. In this case, the use of an acidic or alkaline aqueous solution capable of selectively eluting only the adhesive mixture without causing elution of carbon allows the obtaining of a porous carbon member having carbon for the main component thereof and from which the adhesive mixture has been removed. Furthermore, after having been removed, the adhesive mixture adheres to the periphery of the resulting carbon member, partially adheres to the inside of microvoids, or fills the inside of microvoids.

In the method for producing porous graphite according to the present invention, the aforementioned molten metal is preferably composed of Ag, Bi, Cu, Ga, Ge, Hg, In, Ir, Pb, Pt, Rh, Sb, Sn, Zn or a mixture thereof in the form of an alloy having at least one of these components as a main component thereof, while the aforementioned other main components are preferably composed of Al, B, Be, Ca, Ce, Cr, Dy, Er, Eu, Fe, Gd, Hf, Ho, K, La, Li, Lu, Mg, Mn, Mo, Na, Nb, Nd, Pr, Sc, Se, Si, Sm, Sr, Ta, Ti, V, W, Zr or a mixture containing one or a plurality thereof. In this case, porous graphite can be obtained particularly efficiently.

In the method for producing porous graphite according to the present invention, the aforementioned carbon member is preferably heated to 1500° C. or higher and more preferably heated to 2000° C. or higher in the aforementioned graphitization step. The carbon member is particularly preferably heated to 2400° C. or higher. In these cases, the carbon member can be graphitized efficiently and graphite can be obtained that exhibits remarkable lowering of electrical resistivity as well as higher electrical conductivity and corrosion resistance.

In the method for producing porous graphite according to the present invention, the aforementioned dealloying step is preferably carried out in an inert atmosphere or vacuum atmosphere, or is preferably carried out in air after having added flux to the aforementioned molten metal. In this case, oxidation of the metal bath can be prevented even in air.

The value of the (002) average interplanar spacing of the porous graphite according to the present invention as calculated from the (002) diffraction peak of graphite in bulk is 0.342 or less, pores having a size of 2 nm to 100 nm are contained at 80% or more of total pore volume, and BET specific surface area is 100 m$^2$/g or more.

In addition, the full width at half maximum of the (002) diffraction peak of graphite of the porous graphite according to the present invention is preferably 1.02° or less and crystallite size is preferably 9 nm or more. In addition, the ratio $I_D/I_G$ of peak intensity ($I_D$) of the D band to peak intensity ($I_G$) of the G band of the Raman spectrum is preferably 0.5 or less and full width at half maximum in the aforementioned G band is preferably 45 cm$^{-1}$ or less. In addition, BET specific surface area is preferably 300 m$^2$/g or more, more preferably 700 m$^2$/g or more, and particularly preferably 2400 m$^2$/g or more. In addition, the porous graphite according to the present invention may be in the form of a sheet.

The porous graphite according to the present invention is preferably produced according to the method for producing porous graphite according to the present invention. The porous graphite according to the present invention demonstrates high crystallinity, electrical conductivity and durability, has large specific surface area, and has large bulk density. Consequently, it is able to realize higher durability, output and capacity in the case of being used in the electrodes of various types of batteries and the like.

Effects of the Invention

According to the present invention, a method for producing porous graphite capable of realizing higher durability, output and capacity, and porous graphite, can be provided.

DESCRIPTION OF THE PREFERRED EMBODIMENTS

The following provides an explanation of embodiments of the present invention while indicating examples thereof based on the drawings.

In the method for producing porous graphite of an embodiment of the present invention, porous graphite of an embodiment of the present invention can be produced by subjecting a precursor carbon-containing material to a dealloying step, a graphitization step and an activation step. Furthermore, the graphitization step can be omitted in the case the carbon-containing material is adequately graphitized by the dealloying step.

Example 1

[Fabrication of Precursor]

Figure 1:
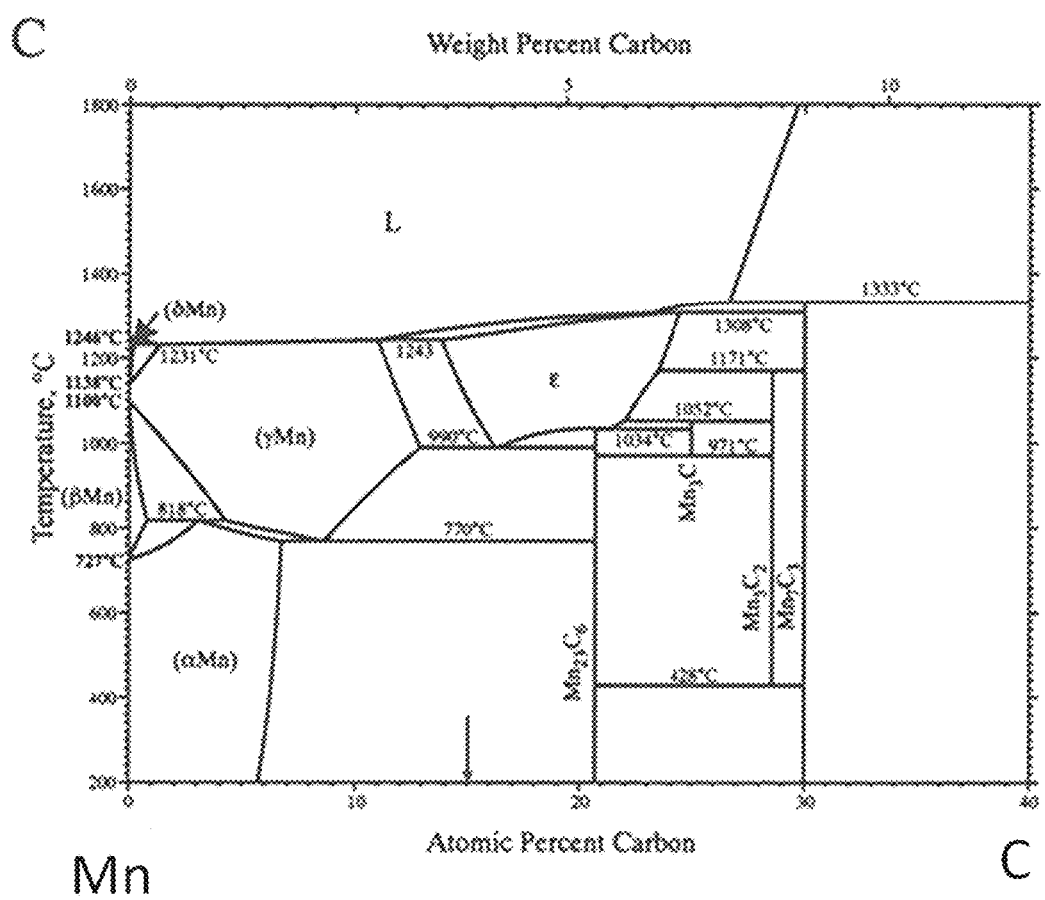
FIG. 1 is a Mn—C phase diagram.

In the method for producing porous graphite of an embodiment of the present invention, a precursor in the form of a carbon-containing material is first fabricated that is composed of carbon and a compound, alloy or non-equilibrium alloy containing other non-carbon main components. For example, with reference to the Mn—C phase diagram shown in FIG. 1, a Mn—C-based precursor alloy is fabricated having Mn as an other non-carbon main component. Furthermore, since a melt of Mn or alloy thereof is typically readily oxidized, melting is preferably carried out in an inert atmosphere such as an argon atmosphere.

[Dealloying Step]

Figure 2:
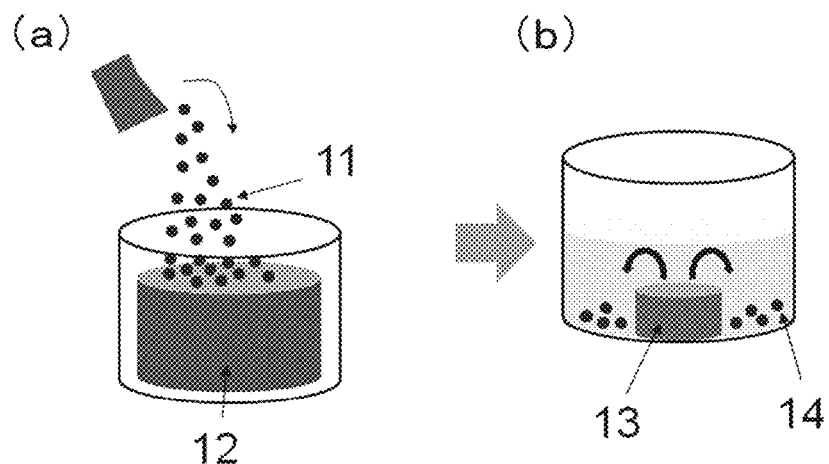
FIG. 2 is a schematic perspective view showing (a) a step for immersing a carbon-containing material in a metal bath, and (b) a step for cleaning porous graphite in a dealloying step in the method for producing porous graphite of an embodiment of the present invention.

Next, as shown in FIG. 2(a), the fabricated precursor carbon-containing material 11 is formed into a powder or sheet in order to improve reactivity, and then immersed for a prescribed amount of time in a metal bath 12 having a solidifying point lower than the melting point of the carbon-containing material 11. At this time, the metal bath 12 is controlled to a temperature that is lower than the minimum value of a liquidus temperature within a composition fluctuation range extending from the carbon-containing material 11 to carbon by reducing the other non-carbon main components. For example, in the case of using a Mn—C-based precursor alloy for the carbon-containing material 11, the metal bath 12 is controlled to a temperature lower than the minimum temperature of 1231° C. of the liquidus temperature within a composition fluctuation range extending to C by reducing Mn based on the phase diagram of FIG. 1. Furthermore, in this case, since it is difficult for the reaction to proceed at a temperature of 600° C. or lower, the metal bath is preferably maintained at a temperature of 600° C. or higher.

Although the duration of immersion in the metal bath 12 varies according to the components of the metal bath 12 and the precursor carbon-containing material 11, in the case of, for example, using molten Bi and molten Ag for the metal bath 12 and immersing the carbon-containing material 11 in the form of an Mn—C-based precursor therein, the carbon-containing material is immersed for about 5 to 10 minutes. In addition, in the case of, for example, using molten Bi for the metal bath 12 and immersing a carbon-containing material 11 in the form of an Mn—C-based precursor therein, since a powdered Mn—C-based precursor is suspended on the surface of the molten metal due to differences in density, the precursor and molten metal are preferably stirred with a rod and the like during the time the carbon-containing material 11 is immersed therein. In addition, since Bi and melts of alloys thereof are typically readily oxidized, the dealloying step in which this is used for the metal bath 12 is preferably carried out in an inert atmosphere such as argon atmosphere or vacuum atmosphere.

As a result of immersing in the metal bath 12, other non-carbon main components (such as Mn) can be selectively eluted into the metal bath 12 from the carbon-containing material 11. As a result, residual carbon undergoes repeated bonding within the metal bath 12 resulting in the formation of particles on the nanometer scale. Moreover, since these particles are partially bonded, a porous, bulk carbon member 13 can be obtained that has microvoids such as mesopores (diameter of 2 nm to 60 nm) or macropores (diameter of 60 nm or more).

Furthermore, since there is the possibility of unreacted precursor 14 remaining in the vicinity of the molten metal surface, that unreacted precursor 14 ends up adhering to the surface of the bulk carbon member 13 after having been removed from the metal bath 12. Therefore, as shown in FIG. 2(b), the unreacted precursor 14 adhered to the surface of the carbon member 13 is removed by cleaning using an ultrasonic cleaner and the like.

Figure 3:
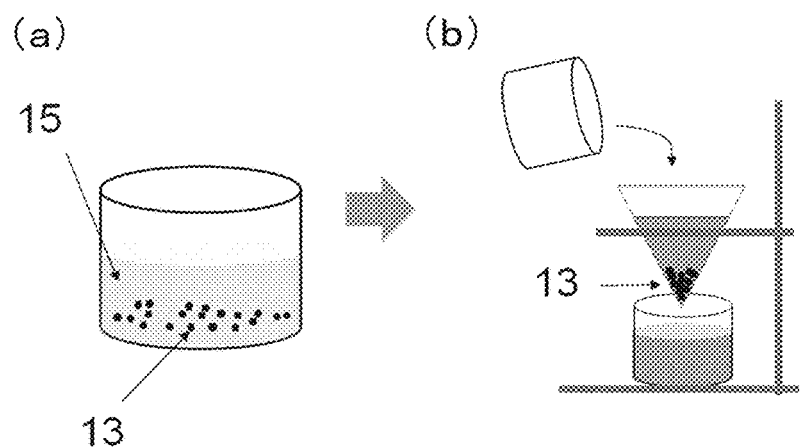
FIG. 3 is a schematic perspective view showing (a) a step for removing an adhesive mixture, and (b) a step for recovering a carbon member in a dealloying in a method for producing porous graphite of an embodiment of the present invention.

An adhesive mixture composed of components of the metal bath 12 and other non-carbon main components (such as Mn) becomes adhered in the periphery of the carbon member 13 and within the microvoids. Consequently, as shown in FIG. 3(a), the resulting carbon member 13 is placed in an acidic or alkaline aqueous solution 15 in order to selectively elute and remove only the adhesive mixture. In one example shown in FIG. 3(a), the aqueous solution 15 into which the carbon member 13 is placed is an aqueous nitric acid solution. At this time, since the reaction proceeds slowly if the carbon member 13 is placed in the solution as is, the upper portion of the carbon member 13 is scraped off using a lathe and the like and transferred to a beaker or other container followed by placing an amount of distilled water therein sufficient for immersing the carbon member 13 and subsequently adding small amounts of nitric acid at a time. After the nitric acid and adhesive mixture have reacted and the adhesive mixture has eluted, as shown in FIG. 3(b), the solid portion of the carbon member 13 is recovered by filtration and the like followed by rinsing and drying. In this manner, a porous carbon member 13 can be obtained that has carbon as the main component thereof and from which the adhesive mixture has been removed.

Figure 4:
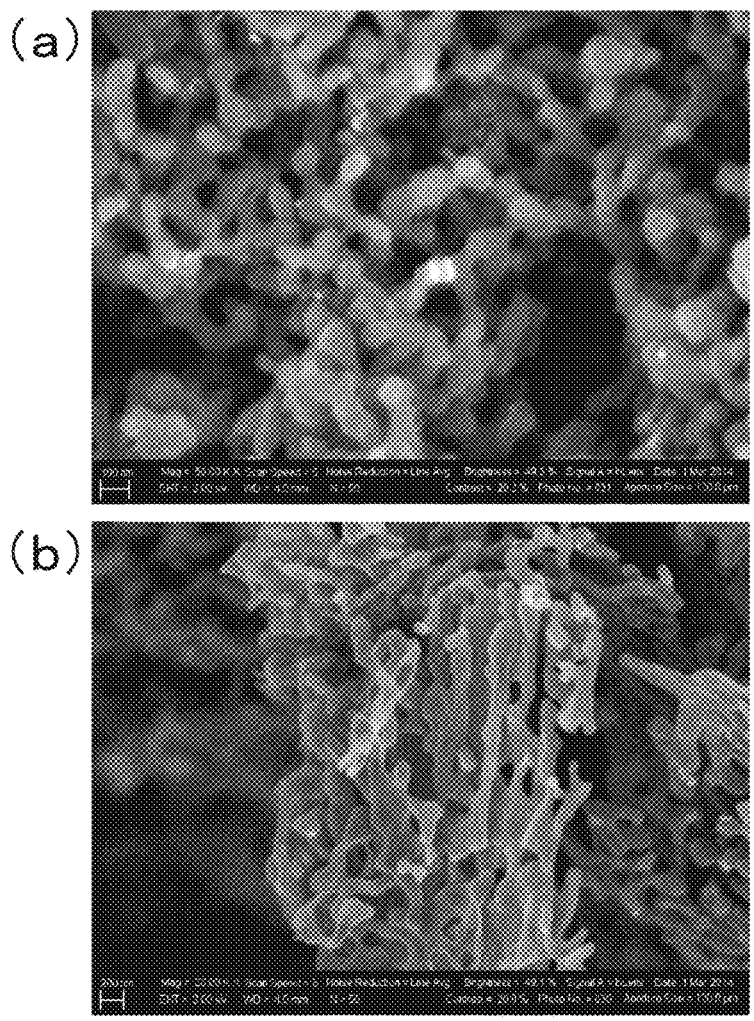
FIG. 4 shows (a) a micrograph of a carbon member obtained according to a dealloying step, and (b) a micrograph taken at half the magnification factor of (a), of a carbon member obtained according to a dealloying step in a method for producing porous graphite of an embodiment of the present invention.
Figure 5:
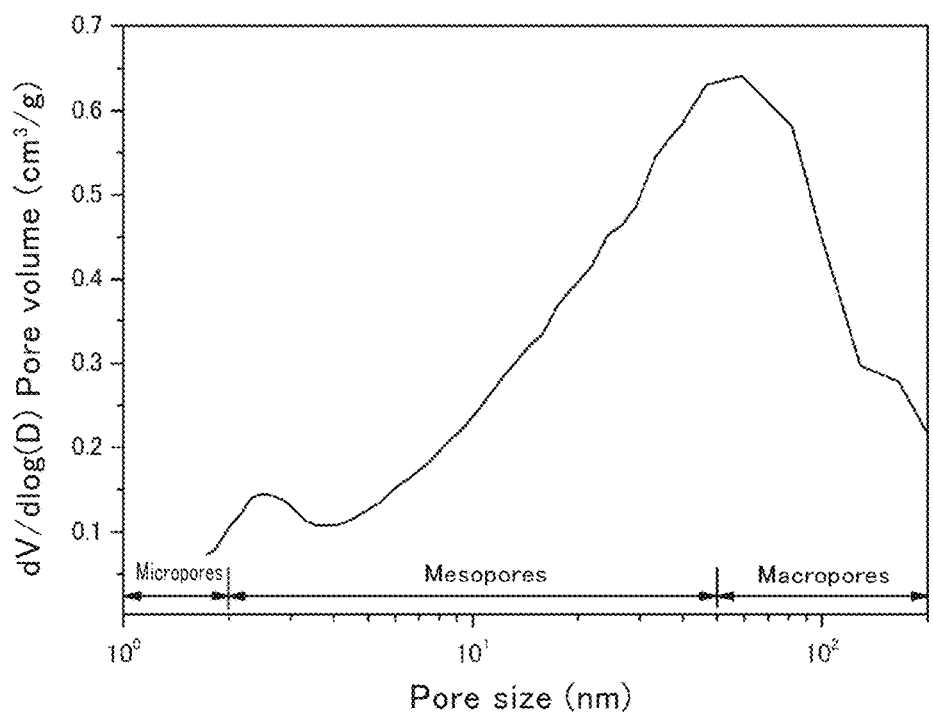
FIG. 5 indicates a graph showing the pore size distribution of a carbon member obtained according to a dealloying step in a method for producing porous graphite of an embodiment of the present invention.

A micrograph of a carbon member obtained in this manner is shown in FIG. 4. In addition, the pore size distribution of the resulting carbon member is shown in FIG. 5. Furthermore, the carbon member shown in FIGS. 4 and 5 was obtained by immersing a precursor carbon material in the form of $Mn_{80}C_{20}$ (values indicate atomic ratios and to apply similarly hereinafter unless specifically indicated otherwise) in a metal bath consisting of molten Bi at a temperature of 1000° C. in an inert atmosphere for 10 minutes. As shown in FIGS. 4 and 5, the resulting carbon member can be confirmed to be porous and have microvoids consisting mainly of mesopores (diameter of 2 nm to 60 nm) and macropores (diameter of 60 nm or more). Furthermore, the carbon member shown in FIGS. 4 and 5 has a BET specific surface area of 223.8 m$^2$/g.

[Graphitization Step]

Figure 6:
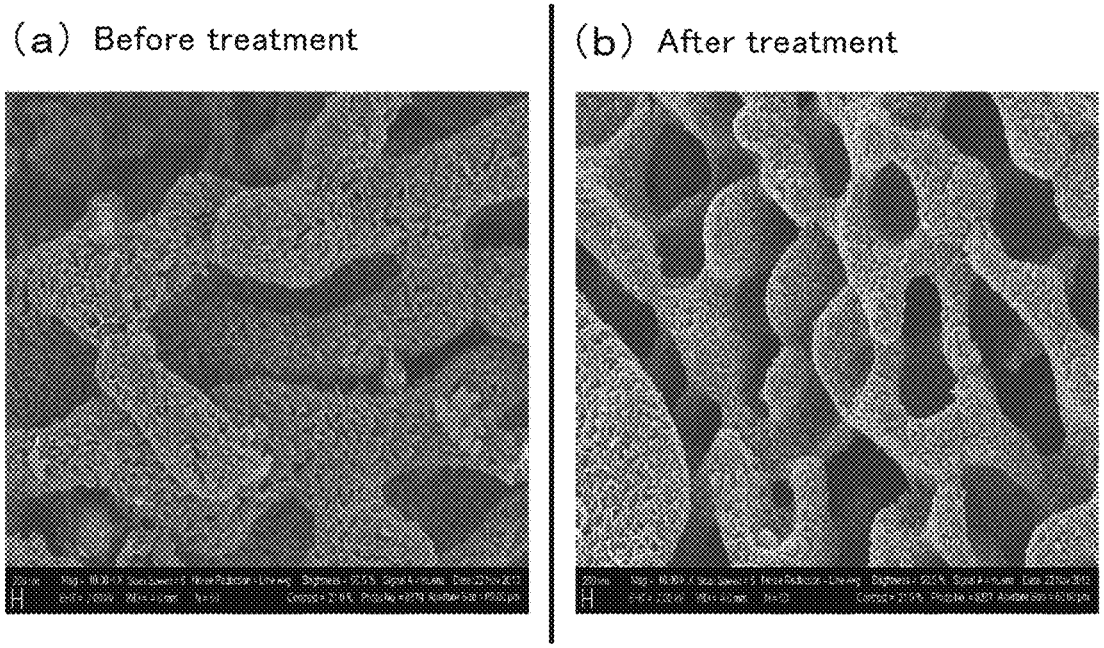
FIG. 6 depicts (a) a micrograph of a carbon member prior to graphitization treatment and (b) a micrograph of a carbon member after graphitization treatment in a method for producing porous graphite of an embodiment of the present invention.
Figure 7:
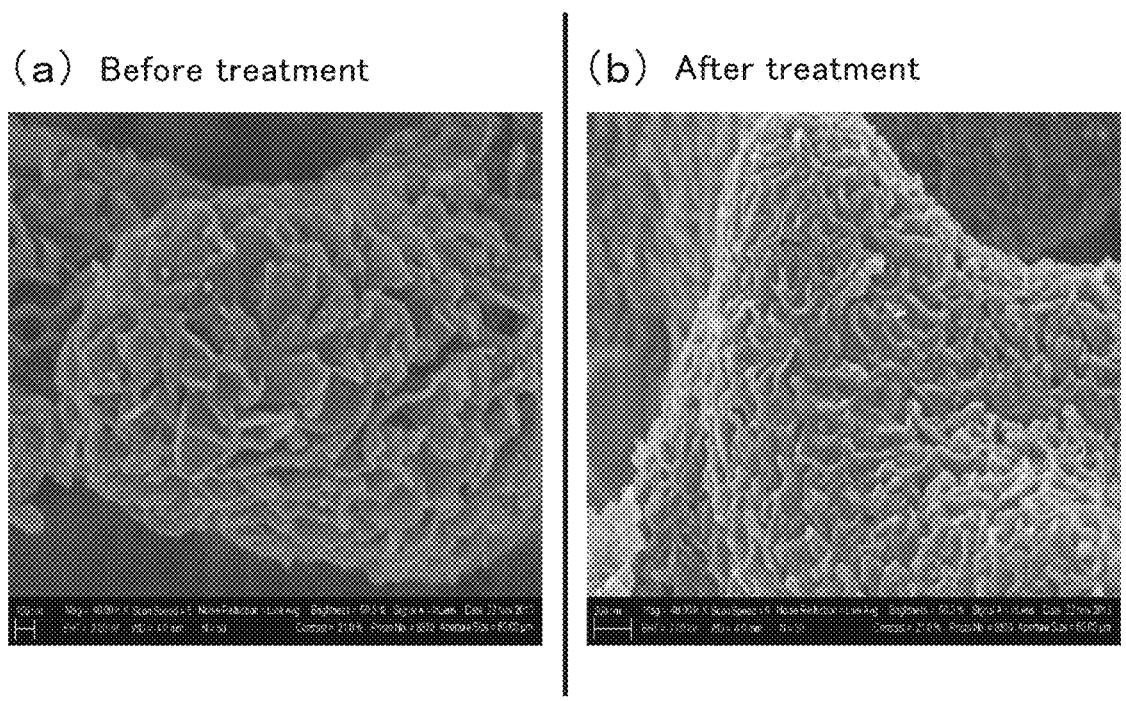
FIG. 7 depicts (a) a micrograph taken at a location of a carbon member prior to graphitization treatment differing from the location of FIG. 6, and (b) a micrograph of a carbon member after graphitization treatment taken at a magnification factor half that of (a) and at a location differing from that of FIG. 6, in a method for producing porous graphite of an embodiment of the present invention.
Figure 8:
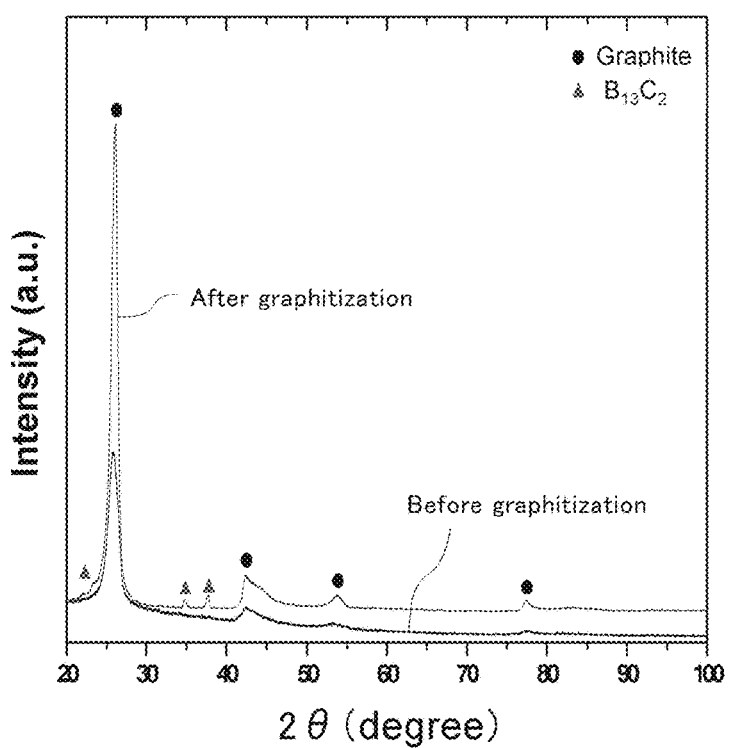
FIG. 8 indicates X-ray diffraction (XRD) patterns of a carbon member before and after graphitization treatment in a method for producing porous graphite of an embodiment of the present invention.
Figure 9:
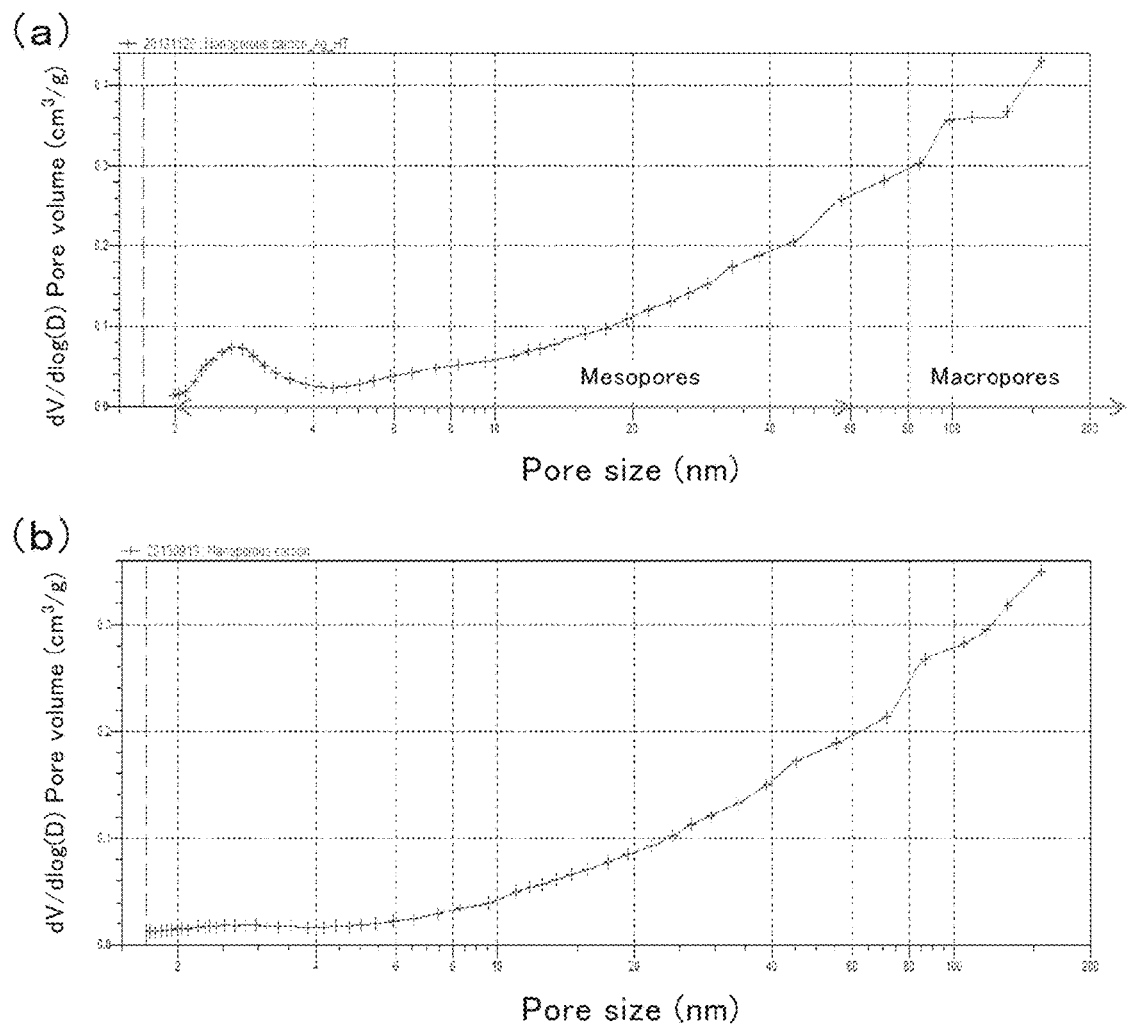
FIG. 9 indicates a graph showing (a) the pore size distribution of a carbon member after graphitization treatment and (b) the pore size distribution of a carbon member before graphitization treatment in a method for producing porous graphite of an embodiment of the present invention.

Next, the resulting carbon member is subjected to graphitization treatment by heating. At this time, the heating temperature is preferably 2000° C. or higher, and particularly preferably 2400° C. or higher, in order to further enhance crystallinity and enhance electrical conductivity by lowering electrical resistivity as a result of graphitization treatment. Micrographs of the carbon member before and after graphitization treatment are shown in FIGS. 6 and 7. In addition, X-ray diffraction (XRD) patterns of the carbon member before and after graphitization treatment are shown in FIG. 8. In addition, pore size distributions of the carbon member before and after graphitization treatment are shown in FIG. 9. Furthermore, the carbon member shown in FIGS. 6 to 9 was subjected to graphitization treatment by immersing a precursor carbon-containing material in the form of $M_{80}C_{20}$ in a metal bath of molten Ag at 1200° C. for 5 minutes followed by heating the resulting carbon member for 1 hour at 2000° C.

As shown in FIGS. 6 and 7, there were hardly any changes observed in the appearance of the carbon member before and after graphitization treatment, and the carbon member was confirmed to retain high thermal stability before and after graphitization treatment. In addition, as shown in FIG. 8, the full width at half maximum of the (002) diffraction peak was confirmed to narrow due to graphitization treatment, and crystallinity of the carbon material as well as electrical conductivity and corrosion resistance (durability) were confirmed to improve as a result of graphitization treatment. Furthermore, the peaks for $B_{13}C_2$ that appeared in FIG. 8 following graphitization are derived from the BN crucible used when melting the Mn—C used for the carbon-containing material.

In addition, as shown in FIG. 9, pore size distribution of the carbon member was confirmed to change hardly at all before and after graphitization treatment, mesopores and macropores of the carbon member were confirmed to not be lost despite undergoing graphitization treatment, and a porous structure was confirmed to be maintained. In addition, the values for BET specific surface area before and after graphitization treatment were 53 m$^2$/g and 49 m$^2$/g, respectively, thereby confirming hardly any change therein. On the basis thereof, the carbon member can be said to be in a highly thermally stable state before and after graphitization treatment.

Figure 10:
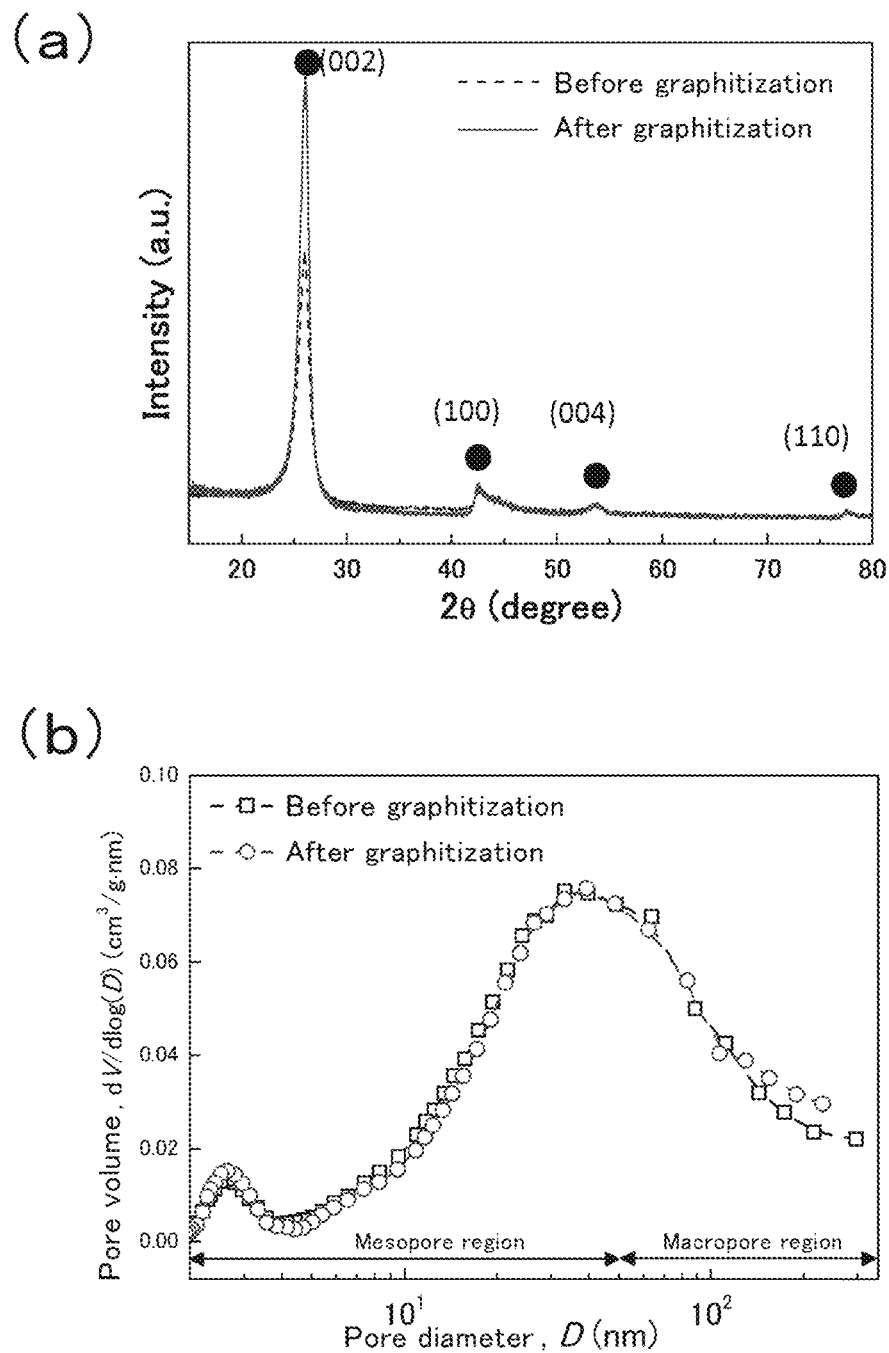
FIG. 10 depicts (a) an XRD pattern and (b) the pore size distribution of a carbon member differing from FIG. 8 and FIG. 9 before and after graphitization treatment in a method for producing porous graphite of an embodiment of the present invention.

In another example of graphitization treatment, a precursor carbon-containing material in the form of $Mn_{80}C_{20}$ was immersed in a metal bath consisting of molten Bi at 900° C. for 10 minutes followed by subjecting the resulting carbon member to graphitization treatment by heating for 1 hour at 2000° C., and the XRD patterns before and after graphitization treatment are shown in FIG. 10(a) while the pore size distributions before and after graphitization treatment are shown in FIG. 10(b). As shown in FIG. 10(a), the full width at half maximum of the (002) diffraction peak was confirmed to narrow due to graphitization treatment in the same manner as shown in FIG. 8. In addition, as shown in FIG. 10(b), there was confirmed to be hardly any change in pore size distribution of the carbon member before and after graphitization treatment in the same manner as FIG. 9. In addition, the values for BET specific surface area before and after graphitization treatment were 151 m$^2$/g and 135 m$^2$/g, respectively, thereby confirming hardly any change in these values.

[Activation Step]

Next, after having been graphitized by graphitization treatment, the carbon material is subjected to activation treatment. Any method may be used to carry out activation treatment provided micropores can be formed in the carbon member, and examples thereof include gas activation using carbon dioxide, water vapor or air, and chemical activation using zinc chloride, sulfate or phosphoric acid.

Figure 11:
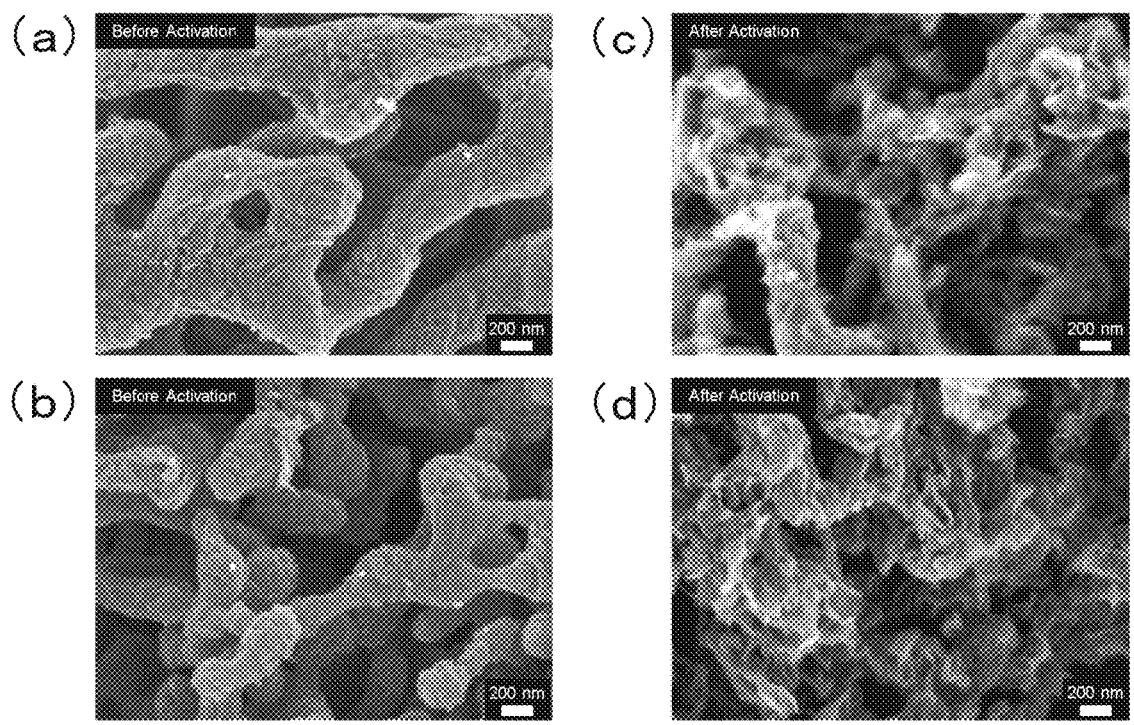
FIG. 11 depicts (a) a micrograph of a carbon member prior to activation treatment, (b) a micrograph of a carbon member prior to activation treatment taken at a different location from that of (a), (c) a micrograph of a carbon member following activation treatment, and (d) a micrograph of a carbon member following activation treatment taken at a different location from that of (c) in a method for producing porous graphite of an embodiment of the present invention.

Following graphitization treatment, the carbon member was subjected to activation treatment using a mixed gas of nitrogen and carbon dioxide while maintaining a temperature of 800° C. for 2 hours, and micrographs of the carbon member before and after activation treatment are shown in FIG. 11. In addition, changes in quantity adsorbed and pore size distribution attributable to graphitization treatment and activation treatment are respectively shown in FIGS. 12(a) and 12(b). Furthermore, the carbon member shown in FIGS. 11 and 12 that was used was obtained by immersing a precursor carbon-containing material in the form of $Mn_{80}C_{20}$ for 10 minutes in a metal bath consisting of molten Bi at 900° C. In addition, graphitization treatment was carried out by heating the carbon member for 1 hour at 2000° C.

As show in FIG. 11, the surface of the graphitized carbon member was confirmed to have been made irregular as a result of carrying out activation treatment. In addition, as shown in FIG. 12(a), as a result of carrying out activation treatment, the quantity adsorbed on the surface of the graphitized carbon member was confirmed to have increased. In addition, as shown in FIG. 12(b), the volume of pores having a diameter of 100 nm or less was confirmed to have increased as a result of activation treatment. In addition, the values of BET specific surface area before and after activation treatment were 135 m$^2$/g and 153 m$^2$/g, respectively, thereby confirming an increase in those values as a result of activation treatment.

Furthermore, as shown in FIGS. 12(a) and 12(b), in the case of carrying out activation treatment without carrying out graphitization treatment, although values for quantity adsorbed, pore volume and BET specific surface area increase in comparison with the case of having carried out activation treatment after graphitization treatment, graphitization treatment is preferably carried out before activation treatment not only for the purpose of increasing specific surface area, but also to enhance crystallinity of the carbon member.

Figure 12:
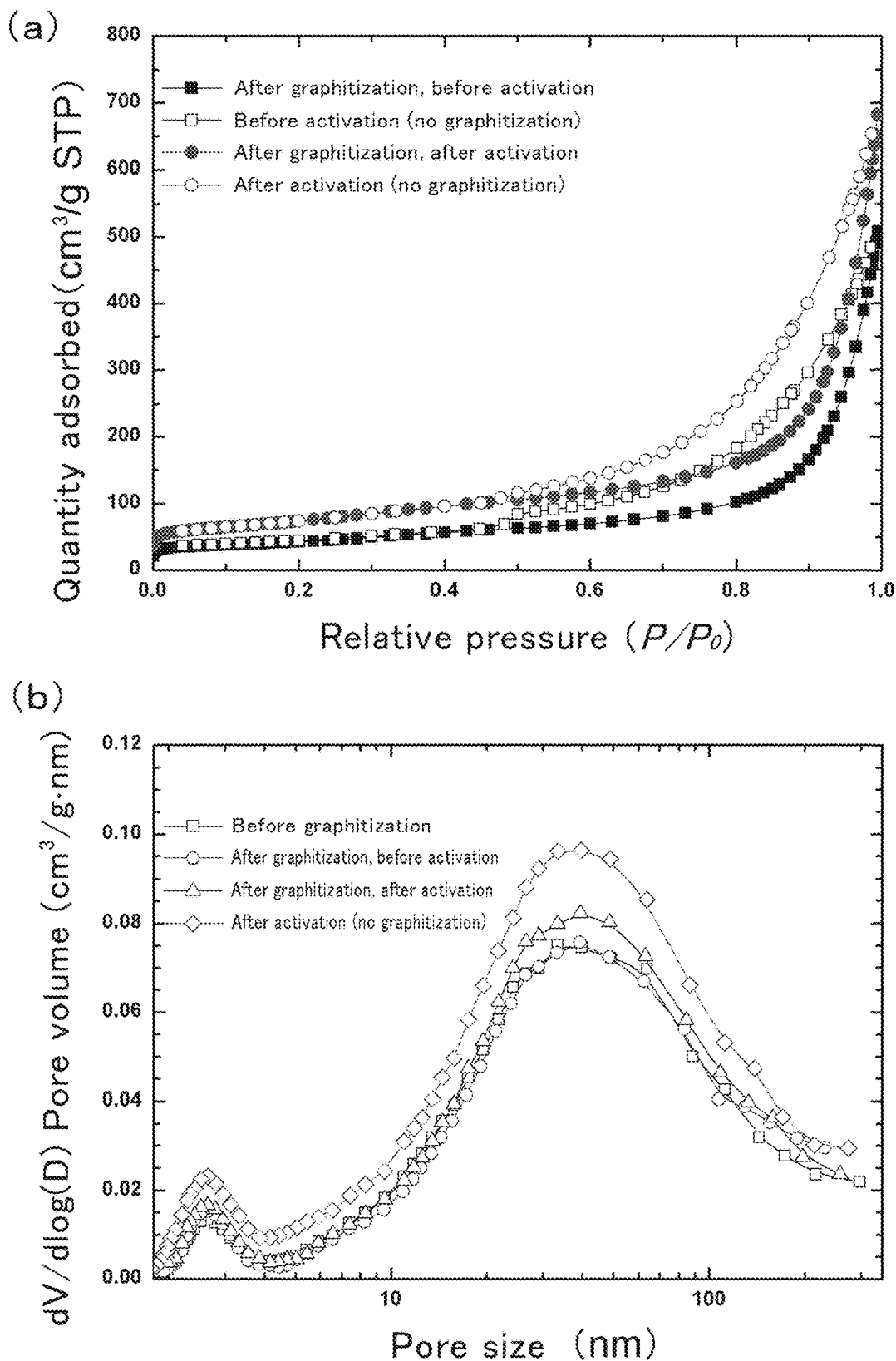
FIG. 12 indicates (a) a graph showing changes in quantity adsorbed, and (b) a graph showing changes in pore size distribution, attributable to graphitization treatment and activation treatment in a method for producing porous graphite of an embodiment of the present invention.

As shown in FIGS. 11 and 12, the specific surface area of the carbon member was able to be increased by activation treatment. According to Non-Patent Document 1, in a porous carbon material formed by ligaments and micropores on the micrometer scale, specific surface area of a maximum of 2355 m$^2$/g is achieved by carrying out gas activation treatment using a mixed gas of nitrogen and carbon dioxide. Although gas activation used in an embodiment of the present invention demonstrates considerable effects on a carbon material having a low degree of graphitization like that provided by Non-Patent Document 1, the effect on a graphitized carbon member according to the present invention is small. The dealloying step of the present invention enables the formation of porous graphite materials composed of ligaments and micropores on the submicrometer scale that are smaller than in Non-Patent Document 1 by a factor of ten. Thus, a large specific surface area in excess of 2400 m²/g is thought to be able to be obtained if activation treatment having a potent activating effect, resulting in effects similar to those of Non-Patent Document 1, is carried out thereon.

Although an example of activation treatment having a potent activating effect is alkaline activation, activation treatment using a metal bath like that indicated below can also be considered in addition thereto. Namely, an element that readily reacts with carbon (such as Ca or Mn) is melted (mixed) in a metal bath consisting of an element that separates from carbon and does not react therewith (such as Bi or Pb). Although porous graphite that has been subjected to graphitization treatment is then immersed therein, at this time, the temperature of the metal bath is controlled to a temperature that is low enough such that the reaction between carbon and an element that readily reacts with carbon does not become a homogenous reaction. As a result, a heterogeneous reaction region is expected to occur on the graphite surface. After lifting out the immersed porous graphite from the metal bath, metal bath components and elemental components that readily react with carbon remaining on the graphite are either removed by immersing in an acidic or alkaline aqueous solution, or depending on the case, are removed by evaporation by heating as is to an ultra-high temperature higher than 2000° C. As a result of this treatment, graphite surface regions where carbon has reacted with elements that readily react with carbon sink resulting in the formation of new micropores or mesopores, or a graphene layer is thought to partially separate from the ligament body starting at this reaction region. As a result of this action, specific surface area is thought to be able to be dramatically improved while maintaining the surface of the porous carbon and internal degree of graphitization.

Example 2

20 g of Bi were inserted into a quartz tube, 2 g of a crushed precursor carbon-containing material in the form of $Mn_{78}C_{22}$ were placed thereon, and flux in the form of boron oxide ($B_2O_3$) particles were further placed thereon. This was then placed directly in an electric furnace preheated to 800° C. followed by holding for 20 minutes while promoting the dealloying reaction between the Bi and precursor by shaking or other means. At this time, the Bi melted and formed a metal bath within the quartz tube, thereby enabling Mn to be selectively eluted from the carbon-containing material into the metal bath. Subsequently, the quartz tube was lifted out of the electric furnace and the melt was allowed to solidify. After immersing the resulting solidified melt in water and removing the boron oxide component, it was immersed in a concentrated aqueous nitric acid solution to remove the Mn and Bi components. This was then subjected to graphitization treatment by heating for 1 hour at 2000° C.

Figure 13:
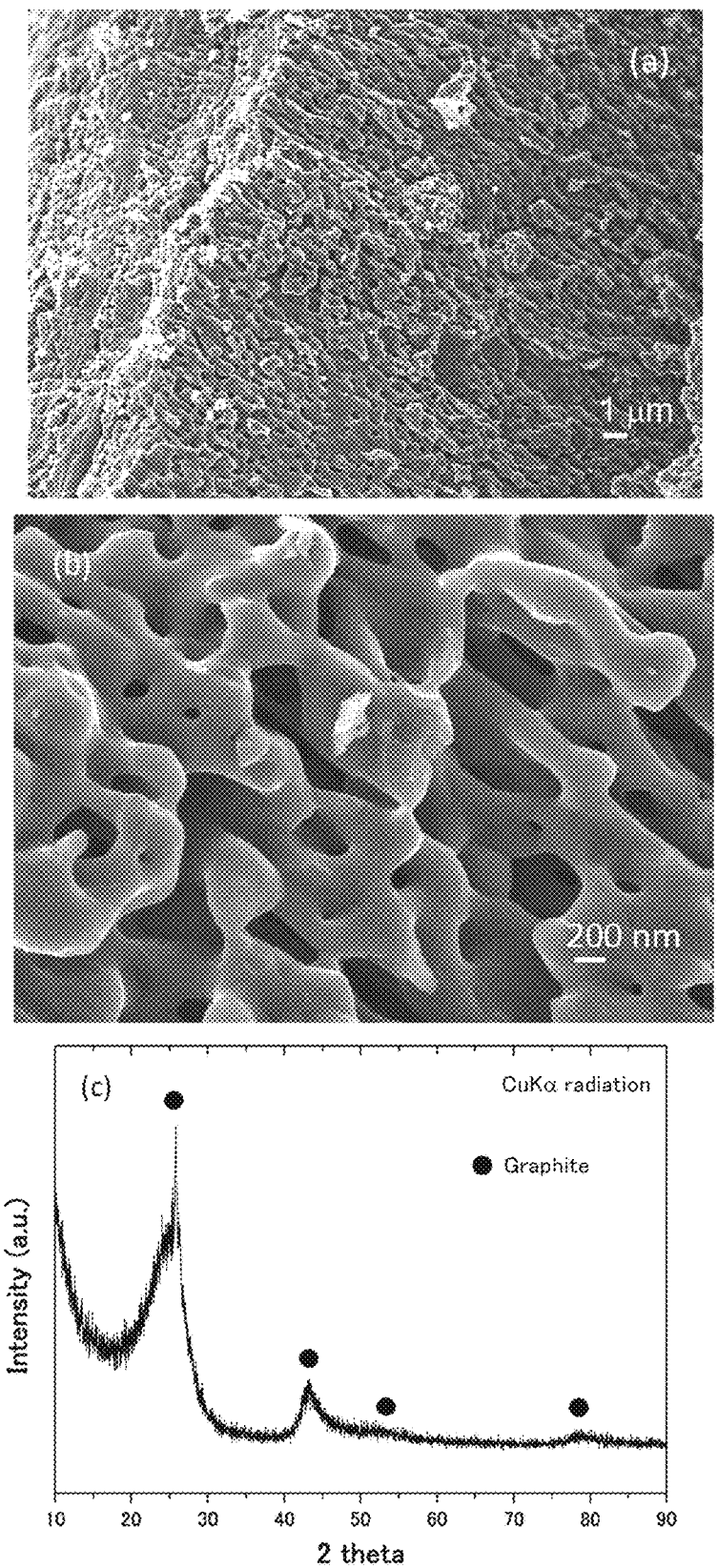
FIG. 13 depicts (a) a scanning electron micrograph, (b) a scanning electron micrograph taken at a higher magnification factor than (a), and (c) an X-ray diffraction (XRD) pattern, of a carbon member following graphitization treatment when a dealloying step has been carried out in air atmosphere using boron oxide flux in a method for producing porous graphite of an embodiment of the present invention.

Scanning electron micrographs of the carbon member following graphitization treatment are shown in FIGS. 13(a) and 13(b), and an XRD pattern thereof is shown in FIG. 13(c). As shown in FIGS. 13(a) and 13(b), the resulting carbon member can be confirmed to be porous and have microvoids mainly composed of mesopores (diameter of 2 nm to 60 nm) and macropores (diameter of 60 nm or more). In addition, as shown in FIG. 13(c), the full width at half maximum of the (002) diffraction peak is clearly observed in the vicinity of 0=25 degrees, thereby confirming the high crystallinity of the carbon member.

On the basis of these results, it was confirmed to be possible to carry out a dealloying step using a Bi bath even in an air atmosphere by using boron oxide as flux, and that porous graphite can be fabricated that has a similar form to that in the case of fabricating in an inert atmosphere without using flux (refer to, for example, FIGS. 4, 6(b), 7(b) and 8).

Example 3

A porous carbon member was obtained by immersing a precursor carbon-containing material in the form of $M_{85}C_{15}$ for 10 minutes (600 seconds) in a Bi metal bath at 800° C. (1073 K). Moreover, the carbon member was immersed in an aqueous nitric acid solution for 24 hours followed by cleaning and drying in order to remove Mn components and Bi components remaining in the periphery and microvoids.

Figure 14:
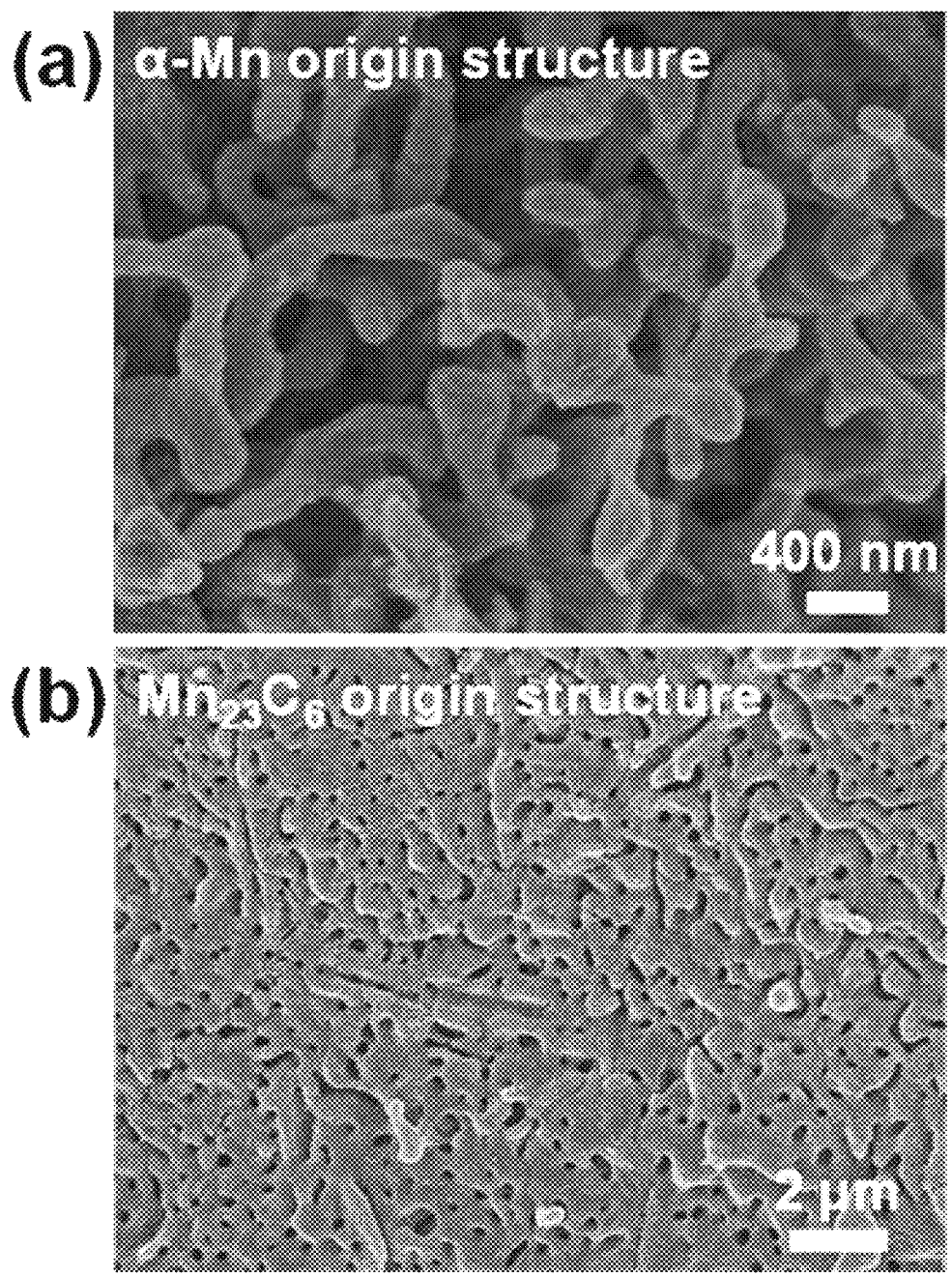
FIG. 14 depicts scanning electron micrographs of structures derived from (a) an α-Mn phase, and (b) a $Mn_{23}C_6$ compound, of a carbon member following a dealloying step when using $Mn_{85}C_{15}$ as a carbon-containing material in a method for producing porous graphite of an embodiment of the present invention.

Furthermore, since the precursor $Mn_{85}C_{15}$ has a biphasic structure consisting of an α-Mn and $Mn_{23}C_6$ compound, scanning electron micrographs of the structure of the carbon member derived from each of these phases are shown in FIG. 14(a) and FIG. 14(b), respectively. The structure derived from the α-Mn shown in FIG. 14(a) was confirmed to have higher porosity than the structure derived from the $Mn_{23}C_6$ compound shown in FIG. 14(b). On the basis thereof, the α-Mn phase is thought to fulfill the role of a flow path for the Bi to go through and diffuse.

[Graphitization Step]

Figure 15:
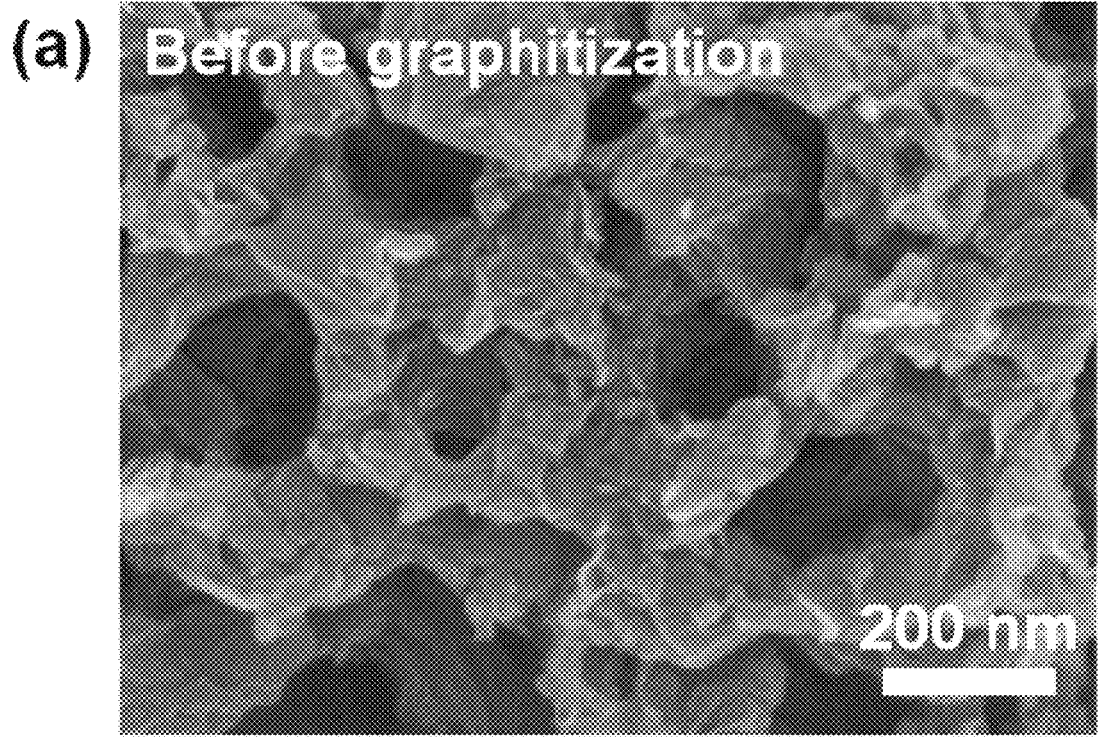
FIG. 15 depicts scanning electron micrographs of a carbon member (a) prior to graphitization treatment and (b) after graphitization treatment at 2000° C. when using $Mn_{85}C_{15}$ as a carbon-containing material in a method for producing porous graphite of an embodiment of the present invention.
Figure 15:
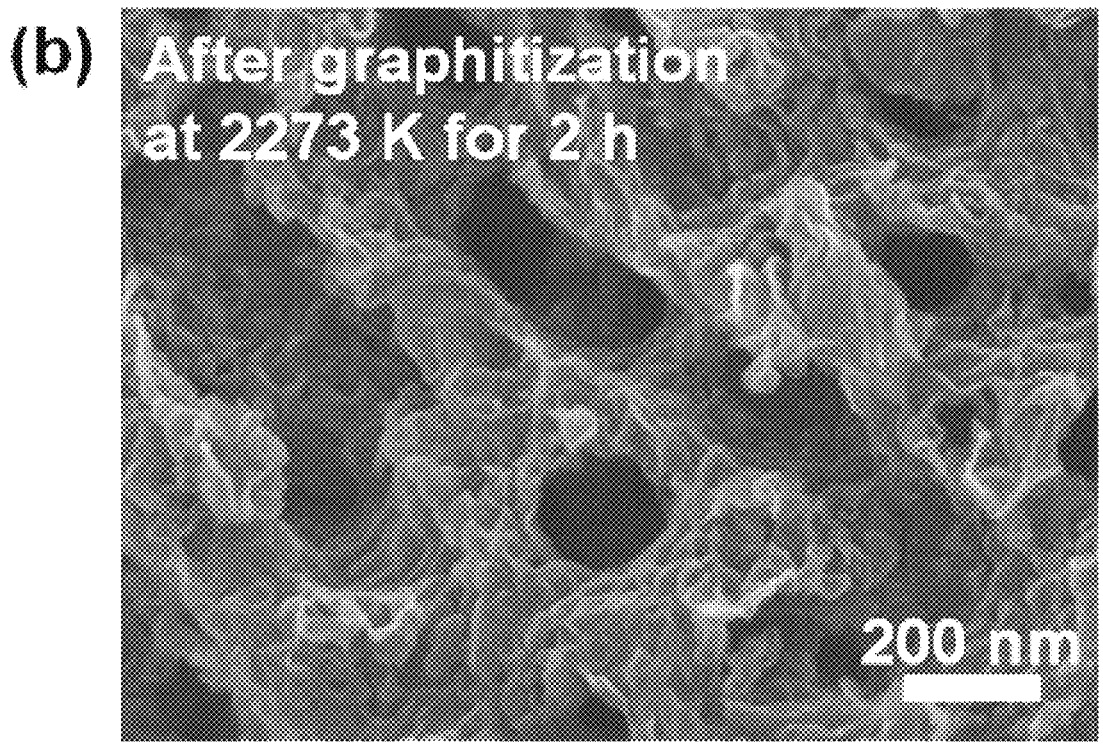

Following the dealloying step, the carbon member obtained in this manner was subjected to graphitization treatment by heating for 2 hours at 1500° C. (1773 K), 2000° C. (2273 K) and 2500° C. (2773 K) respectively. Scanning electron micrographs of the carbon member before and after graphitization when subjected to graphitization treatment at 2000° C. are shown in FIG. 15. As shown in FIG. 15, there were hardly any changes observed in the appearance of the carbon member before and after graphitization treatment, and the carbon member was confirmed to have high thermal stability before and after graphitization treatment.

Figure 16:
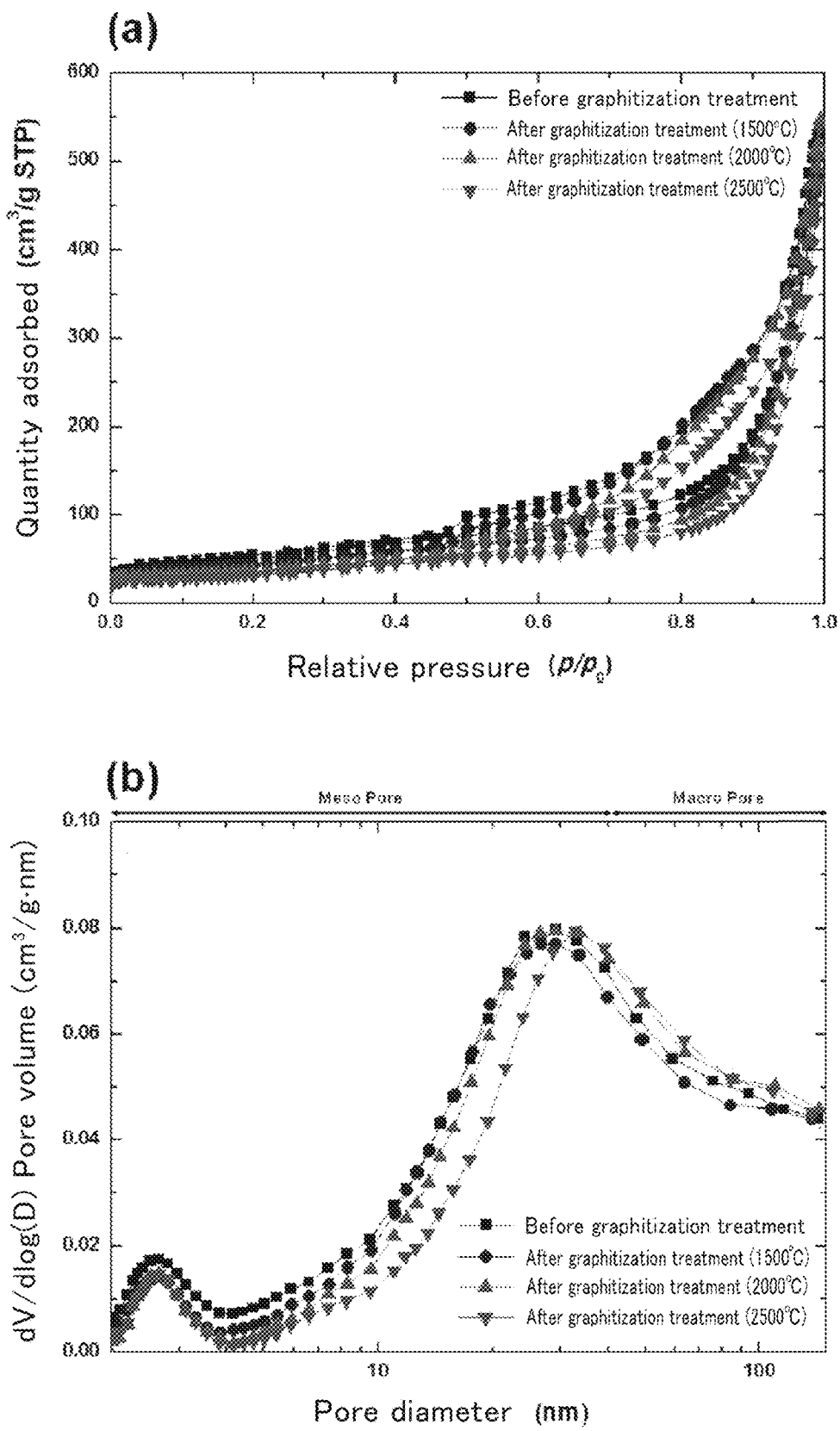
FIG. 16 depicts graphs of (a) adsorbed quantity of $N_2$ and (b) pore size distribution for each heating temperature of graphitization and prior to graphitization treatment when using $Mn_{85}C_{15}$ as a carbon-containing material in a method for producing porous graphite of an embodiment of the present invention.

The adsorbed quantities of $N_2$ for each graphitization heating temperature and before and after graphitization are shown in FIG. 16(a), while pore size distribution is shown in FIG. 16(b). In addition, BET specific surface area ($S_{BET}$) and pore volume ($V_P$) were determined from the results of FIGS. 16(a) and 16(b), and those values are shown in Table 1. Furthermore, data is also shown in Table 1 for a type of carbon black in the form of acetylene black (Denka Black™, Denka Co., Ltd.) for reference purposes.

TABLE 1

| | $S_{BET}$ ($m^2g^{-1}$) | $V_P$ ($cm^3g^{-1}$) | d002 (nm) | $FWHM_{002}$ (°) | $L_c$ (nm) | $I_D/I_G$ | $FWHM_G$ ($cm^{-1}$) |
|---|---|---|---|---|---|---|---|
| Before graphitization treatment | 184.8 | 0.84 | 0.342 | 1.022 | 8.908 | 0.571 | 49.218 |

TABLE 1-continued

| | $S_{BET}$ (m²g⁻¹) | $V_P$ (cm³g⁻¹) | d002 (nm) | FWHM$_{002}$ (°) | $L_c$ (nm) | $I_D/I_G$ | FWHM$_G$ (cm⁻¹) |
|---|---|---|---|---|---|---|---|
| After graphitization treatment at 1500° C. | 157.9 | 0.84 | 0.342 | 1.010 | 9.007 | 0.462 | 44.879 |
| After graphitization treatment at 2000° C. | 134.2 | 0.85 | 0.341 | 0.912 | 9.982 | 0.325 | 32.351 |
| After graphitization treatment at 2500° C. | 117.6 | 0.78 | 0.340 | 0.774 | 11.754 | 0.247 | 26.647 |
| Acetylene black | 52.9 | 0.20 | 0.348 | 1.863 | 4.884 | 0.996 | 70.871 |

As shown in FIG. 16(a), although the quantity adsorbed was observed to tend to decrease slightly as a result of graphitization treatment, the decrease per se was confirmed to not be that large. In addition, as shown in FIG. 16(b), there were hardly any changes in pore size distribution of the carbon member before and after graphitization treatment, mesopores and macropores of the carbon member were not lost due to graphitization treatment, and a porous structure was confirmed to be maintained. As shown in Table 1, although BET specific surface area decreased due to graphitization treatment and as the heating temperature became higher, comparatively high values of about 117 m²/g or more were confirmed to be demonstrated. In addition, despite the decrease in BET specific surface area attributable to graphitization treatment, pore volume was confirmed to demonstrate nearly equal values of about 0.8 cm³/g.

Figure 17:
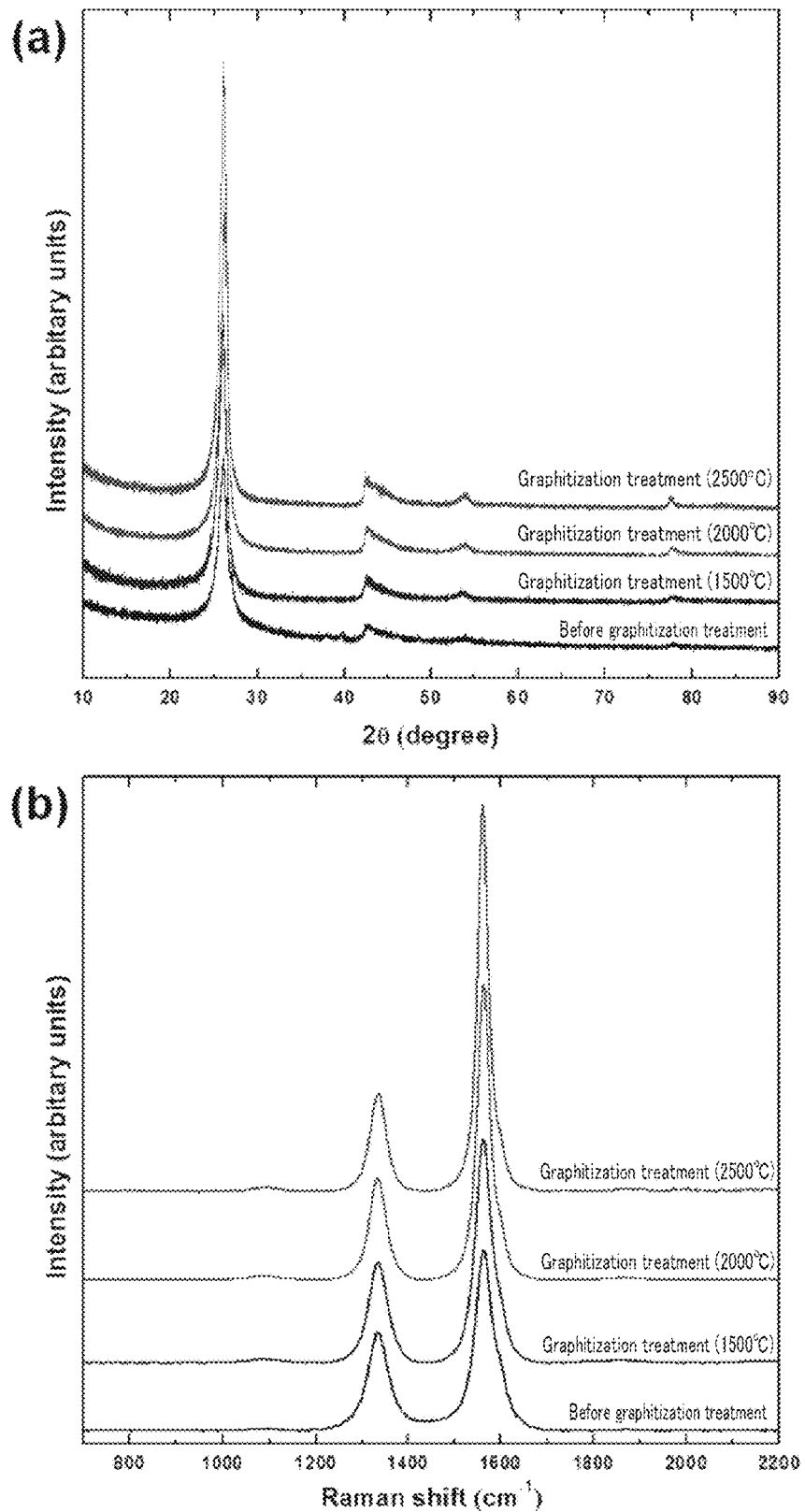
FIG. 17 depicts the (a) XRD pattern and (b) Raman spectrum for each heating temperature of graphitization and prior to graphitization treatment when using $Mn_{85}C_{15}$ as a carbon-containing material in a method for producing porous graphite of an embodiment of the present invention.

XRD patterns for each graphitization heating temperature and before graphitization are shown in FIG. 17(a), and the Raman spectra are shown in FIG. 17(b). In addition, values of the (002) average interplanar spacing ($d_{002}$), as determined from the (002) diffraction peak of graphite, the full width at half maximum of the (002) diffraction peak (FWHM$_{002}$), and crystallite size ($L_c$) in the reference plane were determined from the results of FIG. 17(a) and shown in Table 1. In addition, the peak intensity ratio $I_D/I_G$ of the peak intensity of the D band (having a Raman shift in the vicinity of 1350 cm⁻¹) to the peak intensity of the G band (having a Raman shift in the vicinity of 1582 cm⁻¹), along with full width at half maximum in the G band (FWHM$_G$), were determined from the results of FIG. 17(b) and shown in Table 1.

As shown in FIGS. 17(a) and 17(b), planarity was determined to increase and defect density was determined to decrease as heating temperature became higher. In addition, as shown in Table 1, although the values for $d_{002}$, FWHM$_{002}$, $I_D/I_G$ and FWHM$_G$ deceased as heating temperature became higher, $L_c$ was confirmed to increase.

Figure 18:
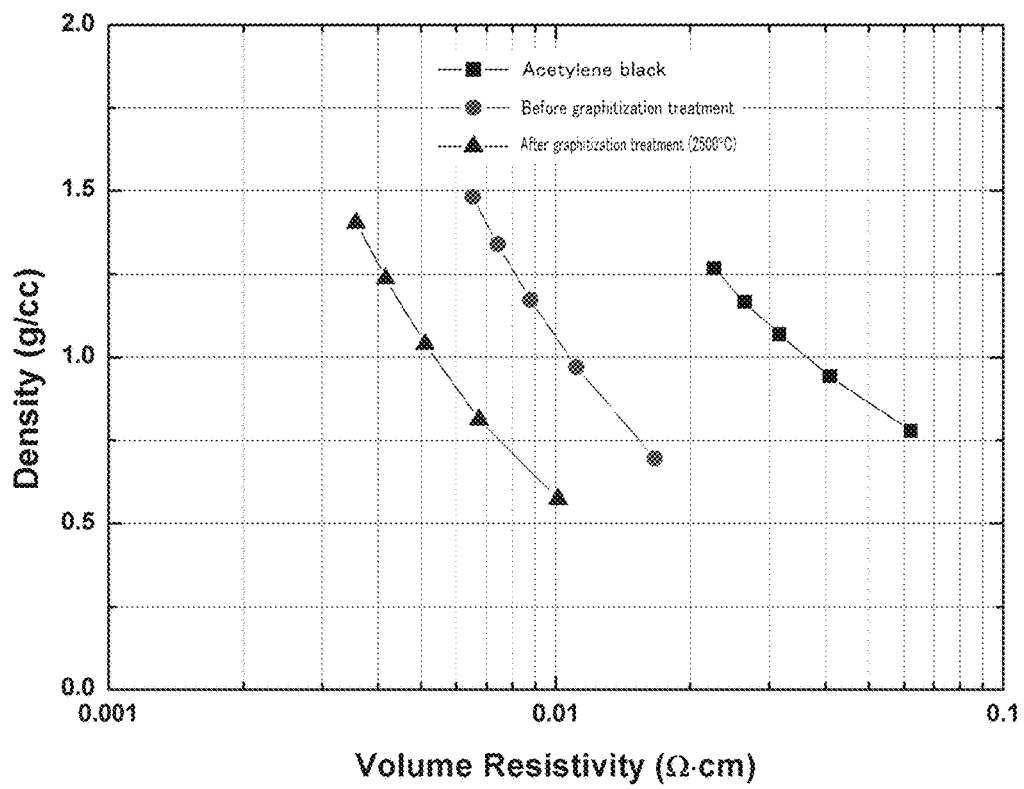
FIG. 18 depicts a graph indicating the relationship between density and volume resistivity before graphitization treatment and after graphitization treatment at 2500° C. when using $Mn_{85}C_{15}$ as a carbon-containing material in a method for producing porous graphite of an embodiment of the present invention.

The relationship between density and volume resistivity before graphitization treatment and after graphitization treatment at 2500° C. is shown in FIG. 18. Furthermore, data is also shown in FIG. 18 for acetylene black (Denka Black™, Denka Co., Ltd.) for reference purposes. As shown in FIG. 18, volume resistivity was confirmed to roughly decrease by half due to graphitization treatment. Based on the results of the aforementioned FIGS. 16 to 18 and Table 1, crystallinity of the carbon member improved as a result of graphitization treatment and both electrical conductivity and corrosion resistance (durability) can also be said to have improved.

[Activation Step]

Following the dealloying step, the carbon member (that had not been subjected to graphitization treatment) was subjected to activation treatment. Activation treatment employed two methods consisting of the use of carbon dioxide and the use of zinc chloride. First, in the case of activation treatment using carbon dioxide, treatment was carried out at 700° C., 800° C., 850° C., 900° C. and 950° C. respectively using a mixed gas containing nitrogen and about 10% carbon dioxide. The rate of the temperature rise up to each temperature was 10° C./min, and the carbon member was held at each temperature for 2 hours. In addition, the flow rate of the mixed gas was 1 liter/min.

Figure 19:
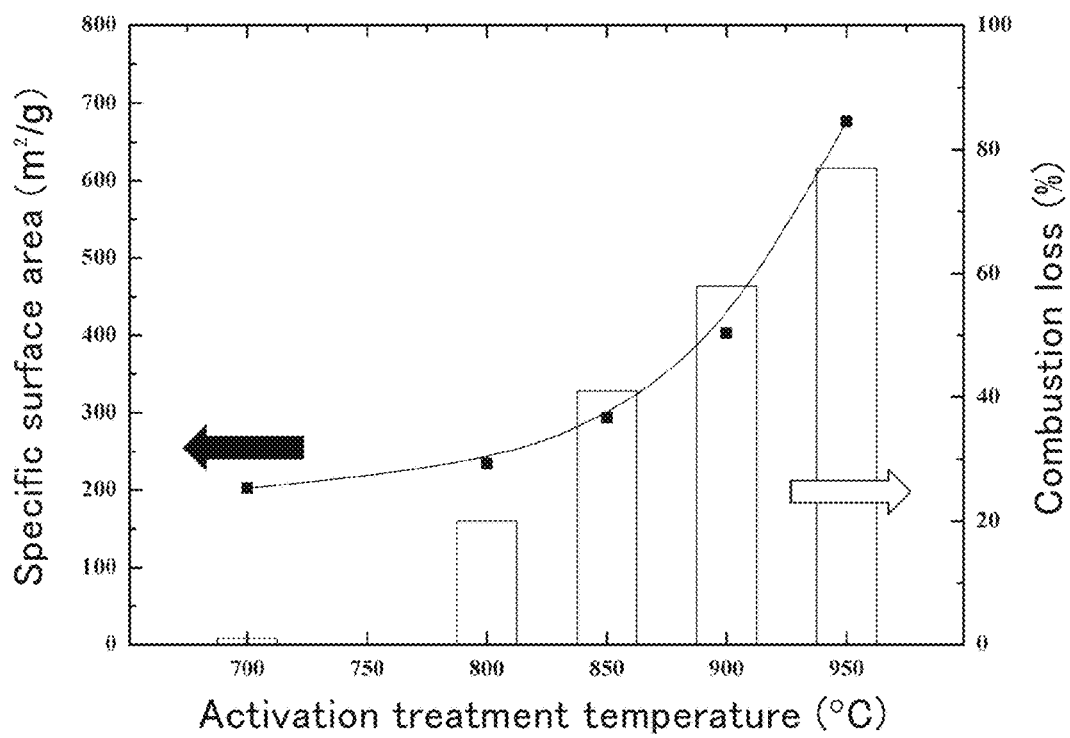
FIG. 19 depicts a graph indicating changes in BET specific surface area and combustion loss relative to activation treatment temperature when using $Mn_{85}C_{15}$ as a carbon-containing material in a method for producing porous graphite of an embodiment of the present invention.

The values for BET specific surface area and combustion loss following activation treatment are shown in FIG. 19. Furthermore, the BET specific surface area before activation treatment was 184.4 m²/g. As shown in FIG. 19, BET specific surface area and combustion loss were confirmed to increase as a result of carrying out activation treatment. In particular, BET specific surface area increased rapidly as the temperature of activation treatment became higher, demonstrating a value of about 700 m²/g during activation treatment at 950° C.

Figure 20:
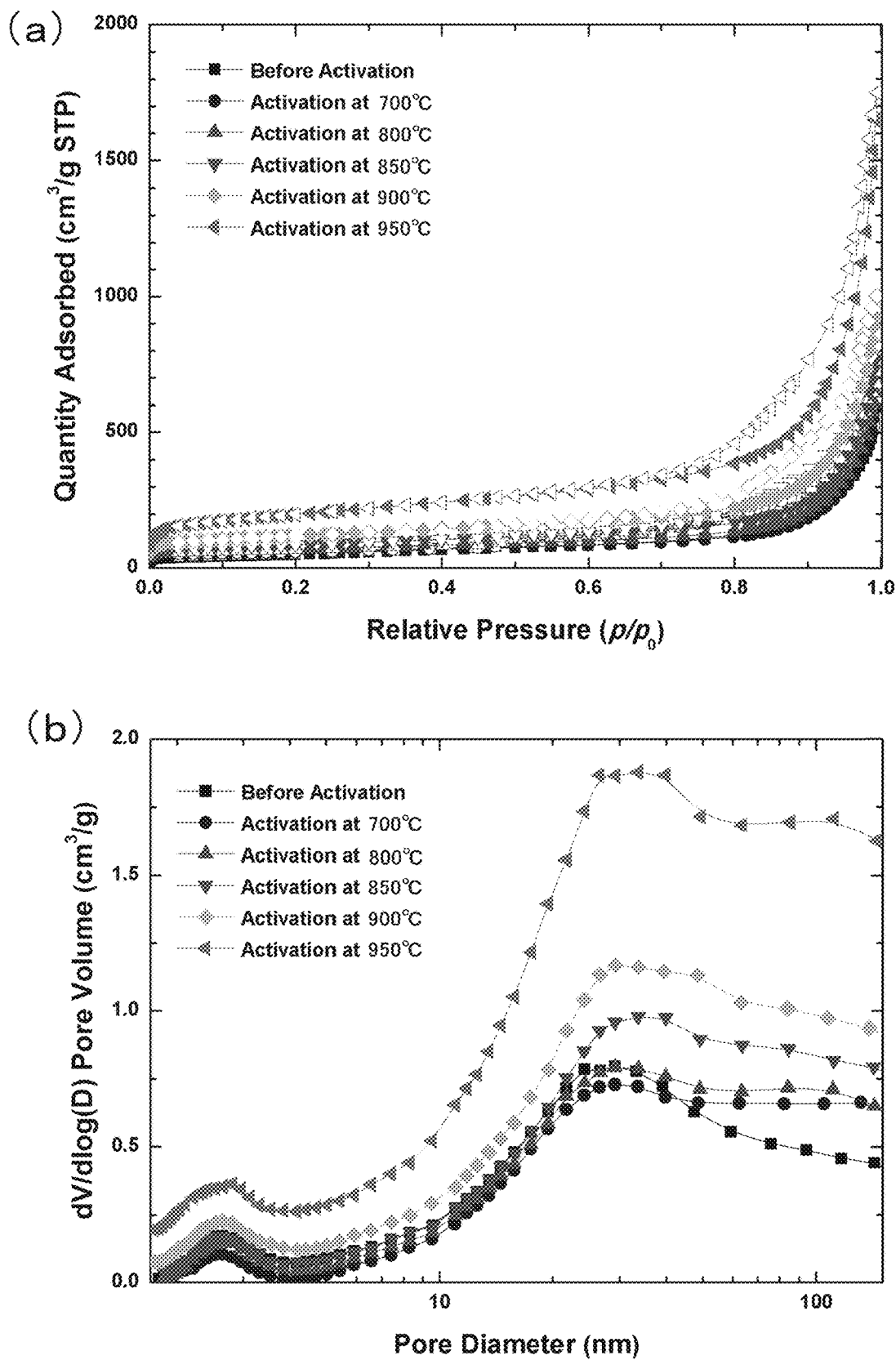
FIG. 20 depicts graphs of (a) changes in quantities adsorbed and desorbed and (b) changes in pore size distribution attributable to activation treatment using carbon dioxide when using $Mn_{85}C_{15}$ as a carbon-containing material in a method for producing porous graphite of an embodiment of the present invention.

Changes in quantity adsorbed and changes in the pore distribution before and after activation treatment are shown in FIGS. 20(a) and 20(b), respectively. Here, the colored symbols in FIG. 20(a) indicate the quantity of adsorbed nitrogen, while the white symbols indicate the quantity of desorbed nitrogen. As shown in FIG. 20(a), the quantity adsorbed on the surface of the carbon member was confirmed to increase as a result of carrying out activation treatment. In addition, as shown in FIG. 20(b), at least the volume of pores having a diameter of 100 nm or less was confirmed to increase as a result of activation treatment, and specific surface area was also confirmed to increase. In particular, not only micropores, but also mesopores having a diameter in the vicinity of 30 nm, were confirmed to increase during activation treatment at 850° C. or higher.

The carbon member was subjected to X-ray diffraction before and after activation treatment, and values of the (002) average interplanar spacing ($d_{002}$), as determined from the (002) diffraction peak of graphite, and crystallite size ($L_c$) in the reference plane were determined from the resulting XRD patterns and shown in Table 2. In addition, porosity of the carbon member was also determined before and after activation treatment and shown in Table 2.

TABLE 2

|  | Before activation treatment | Activation treatment at 700° C. | Activation treatment at 800° C. | Activation treatment at 850° C. | Activation treatment at 900° C. | Activation treatment at 950° C. |
|---|---|---|---|---|---|---|
| $L_c$ (XRD) | 8.91 | 8.65 | 8.99 | 9.14 | 9.52 | 9.38 |
| $d_{002}$ (XRD) | 0.342 | 0.340 | 0.341 | 0.340 | 0.340 | 0.340 |
| Porosity (%) | 63.8 | 67.0 | 68.7 | 72.6 | 76.5 | 85.0 |

As shown in Table 2, although $d_{002}$ demonstrated nearly constant values regardless of the temperature during activation treatment, $L_c$ and porosity were confirmed to increase as the temperature of activation treatment became higher. On the basis thereof, not only was specific surface area confirmed to increase, but also crystallinity was also confirmed to improve to a certain extent as the temperature of activation treatment became higher. Furthermore, although graphitization treatment was not carried out here, it is thought that $L_c$ increases, crystallinity of the carbon member improves, and both electrical conductivity and corrosion resistance (durability) also improve as a result of carrying out graphitization treatment prior to activation treatment.

Next, activation treatment was carried out using zinc chloride in addition to carbon dioxide. In the case of activation treatment using zinc chloride, zinc chloride and a carbon member obtained following the dealloying step (that had not undergone graphitization treatment) were mixed with 50 ml of water at a weight ratio of 5:1 followed by immersing for about 2 hours at 70° C. while stirring. Subsequently, the mixture was dried for about 1 day at 120° C. to evaporate all of the water. The resulting dried substance was heated for 4 hours at 500° C. in an electric furnace to carry out activation treatment by evaporating zinc chloride adhered to the surface of the carbon member. After heating, the carbon member was cleaned with 1 M aqueous hydrochloric acid solution followed by recovering the carbon member by filtration.

Figure 21:
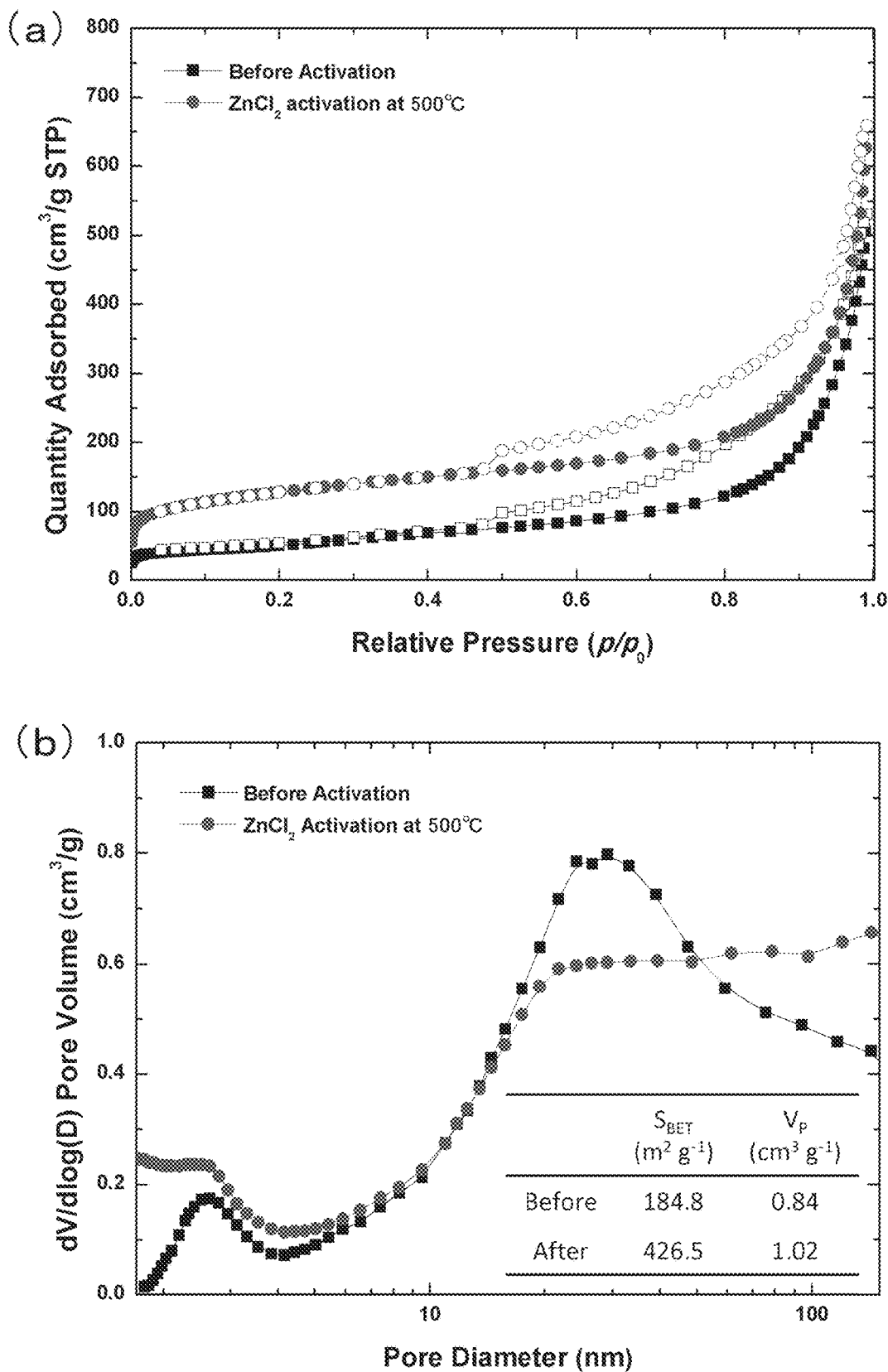
FIG. 21 depicts graphs indicating (a) changes in quantities adsorbed and desorbed and (b) changes in pore size distribution, along with a table indicating BET specific surface area ($S_{BET}$) and pore volume ($V_P$), attributable to activation treatment using zinc chloride when using $Mn_{85}C_{15}$ as a carbon-containing material in a method for producing porous graphite of an embodiment of the present invention.

Changes in quantity adsorbed and pore size distribution before and after activation treatment are shown in FIGS. 21(a) and 21(b), respectively. Here, the colored symbols in FIG. 21(a) indicate the quantity of adsorbed nitrogen, while the white symbols indicate the quantity of desorbed nitrogen. As shown in FIG. 21(a), the quantity adsorbed on the surface of the carbon member was confirmed to increase as a result of carrying out activation treatment. In addition, as shown in FIG. 21(b), the volume of micropores mainly having a diameter of 3 nm or less was confirmed to increase as a result of activation treatment. This indicates a different trend from the activation treatment using carbon dioxide shown in FIG. 20(b).

The values for BET specific surface area ($S_{BET}$) and pore volume ($V_P$) were determined from the results of FIGS. 21(a) and 21(b) and shown in FIG. 21(b). BET specific surface area and pore volume increased as a result of activation treatment, demonstrating values of 426.5 m²/g and 1.02 cm³/g, respectively. In particular, BET specific surface area was confirmed to increase to more than double that prior to activation treatment.

Example 4

Figure 22:
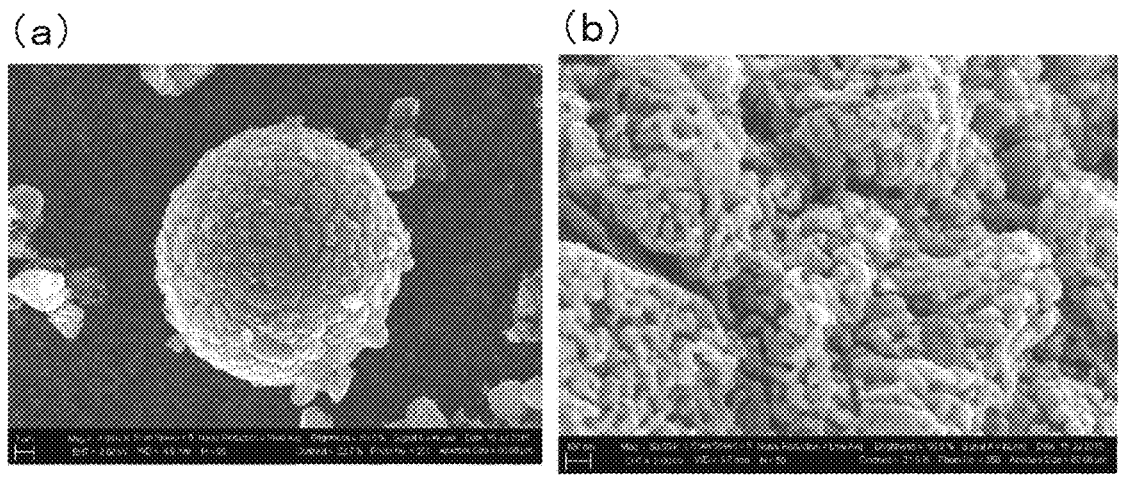
FIG. 22 depicts (a) a scanning electron micrograph and (b) a scanning electron micrograph taken at a higher magnification factor than (a) of a carbon member obtained by carrying out a dealloying step in a Zn metal bath when using $Mn_{79}C_{2i}$ as a carbon-containing material in a method for producing porous graphite of an embodiment of the present invention.

A porous carbon member was obtained by immersing a precursor carbon-containing material in the form of $Mn_{79}C_{21}$ for 15 minutes (900 seconds) in a zinc metal bath at 700° C. (973 K) while stirring at 250 rpm. Moreover, in order to remove Mn components and Zn components remaining in the periphery and microvoids, the carbon member was immersed for 24 hours in an aqueous nitric acid solution followed by cleaning and drying. A micrograph of the resulting carbon member is shown in FIG. 22. As shown in FIG. 22, the resulting carbon member can be confirmed to be porous and have microvoids. On the basis of this result, the dealloying step was confirmed to be able to be carried out with a Zn metal bath.

Example 5

Figure 23:
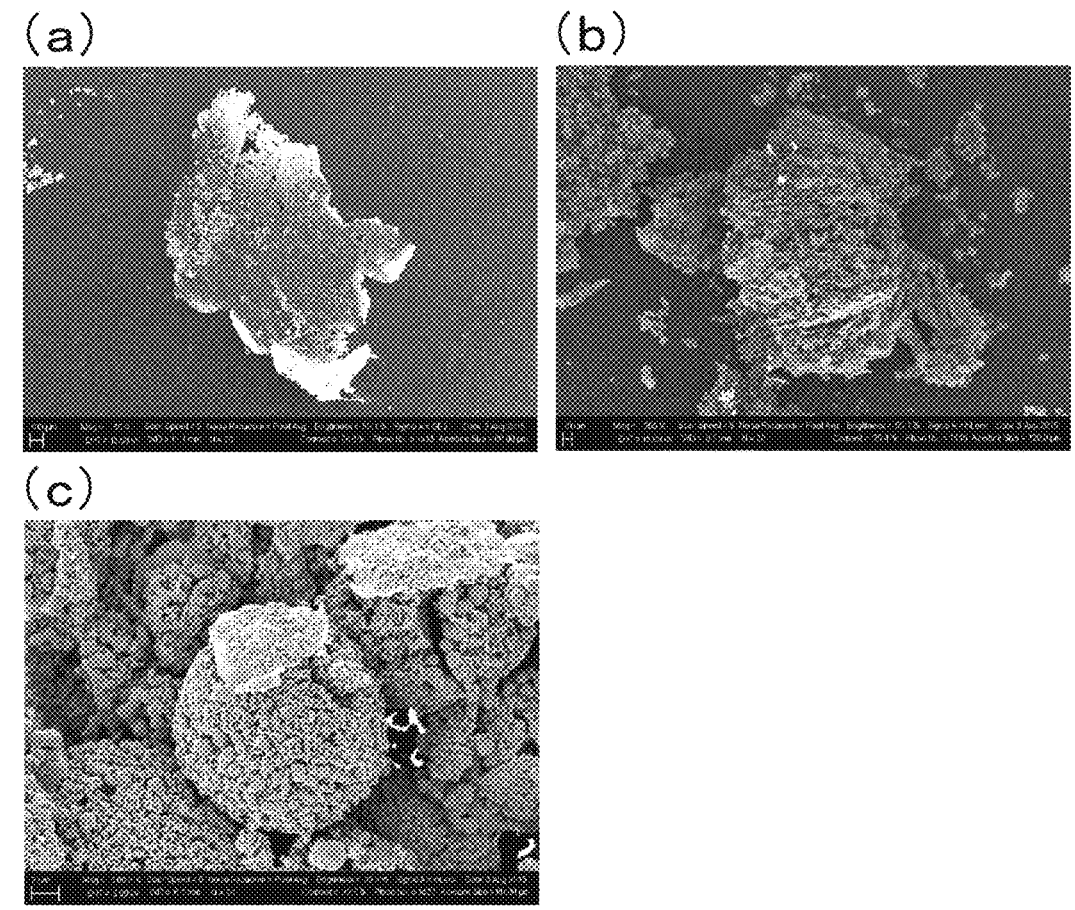
FIG. 23 depicts (a) a scanning electron micrograph, (b) a scanning electron micrograph taken at a higher magnification factor than (a), and (c) a scanning electron micrograph taken at a higher magnification factor than (b) of a carbon member obtained by carrying out a dealloying step in a Cu metal bath when using $Mn_{79}C_{2i}$ as a carbon-containing material in a method for producing porous graphite of an embodiment of the present invention.

A porous carbon member was obtained by immersing a precursor carbon-containing material in the form of $Mn_{79}C_{21}$ for 5 minutes (300 seconds) in a Cu metal bath at 1150° C. (1423 K). Moreover, in order to remove Mn components and Cu components remaining in the periphery and microvoids, the carbon member was immersed for 24 hours in an aqueous nitric acid solution followed by cleaning and drying. A micrograph of the resulting carbon member is shown in FIG. 23. As shown in FIG. 23, the resulting carbon member can be confirmed to be porous and have microvoids. On the basis of this result, the dealloying step was confirmed to be able to be carried out with a Cu metal bath.

Figure 24:
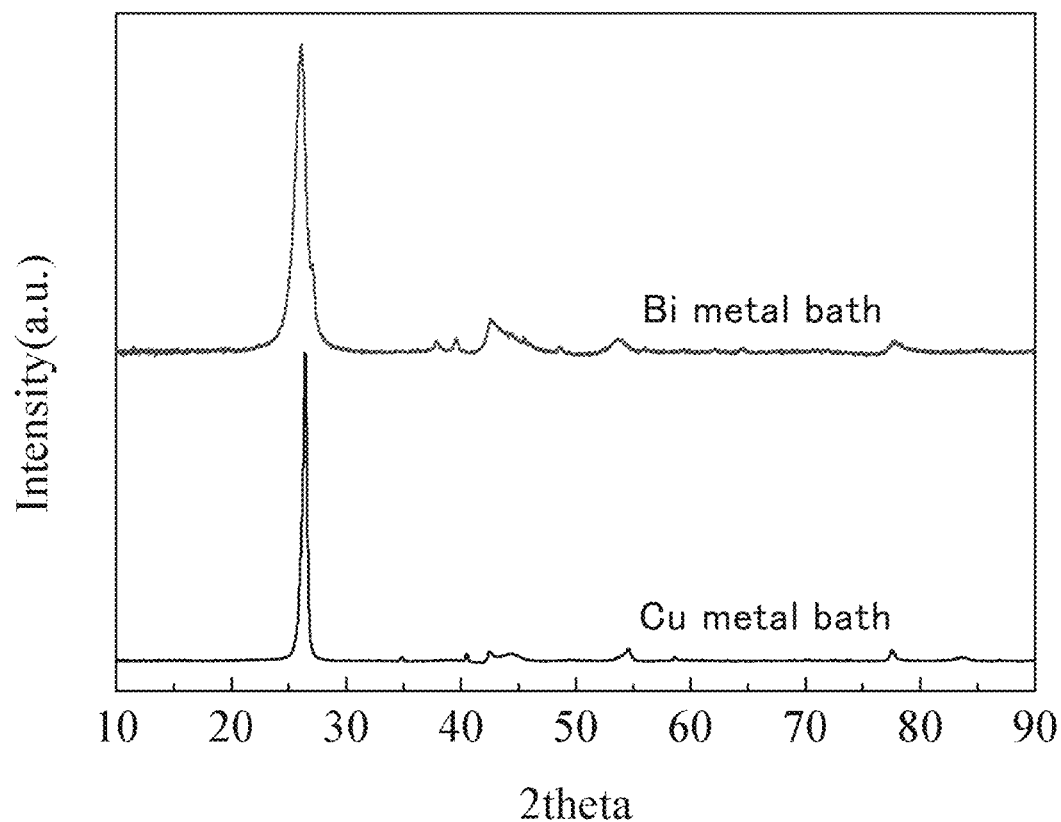
FIG. 24 is drawing that compares an XRD pattern of a carbon member obtained by carrying out a dealloying step in a Cu metal bath when using $Mn_{79}C_{2i}$ as a carbon-containing material with an XRD pattern of a carbon member obtained by carrying out a dealloying step in a Bi metal bath using the same carbon-containing material in a method for producing porous graphite of an embodiment of the present invention.

XRD patterns of the resulting carbon member are shown in FIG. 24. In addition, peak location (2θ), $d_{002}$ and $FWHM_{002}$ were determined from the results of FIG. 24 and shown in Table 3. In addition, $FWHM_G$ and $I_D/I_G$ were determined from the results of the Raman spectrum of the resulting carbon member and shown in Table 3. Furthermore, the results for a carbon member obtained by immersing the same precursor for 15 minutes in a Bi metal bath at 1100° C. are also shown in FIG. 24 and Table 3 for comparison.

TABLE 3

|  | 2θ (deg) | $d_{002}$ (nm) | $FWHM_{002}$ (deg) | $I_D/I_G$ | $FWHM_G$ (cm⁻¹) |
|---|---|---|---|---|---|
| Bi metal bath | 26.11 | 3.410 | 1.100 | 0.48 | 45.31 |
| Cu metal bath | 26.50 | 3.360 | 0.468 | 0.20 | 29.02 |

As shown in Table 3, carrying out the dealloying step in a Cu metal bath was confirmed to result in smaller values for $d_{002}$, $FWHM_{002}$, $I_D/I_G$ and $FWHM_G$ in comparison with the use of a Bi metal bath. On the basis thereof, carrying out the dealloying step in a Cu metal bath can be said to allow the obtaining of a carbon member having high crystallinity and both high electrical conductivity and corrosion resistance (durability).

Example 6

Figure 25:
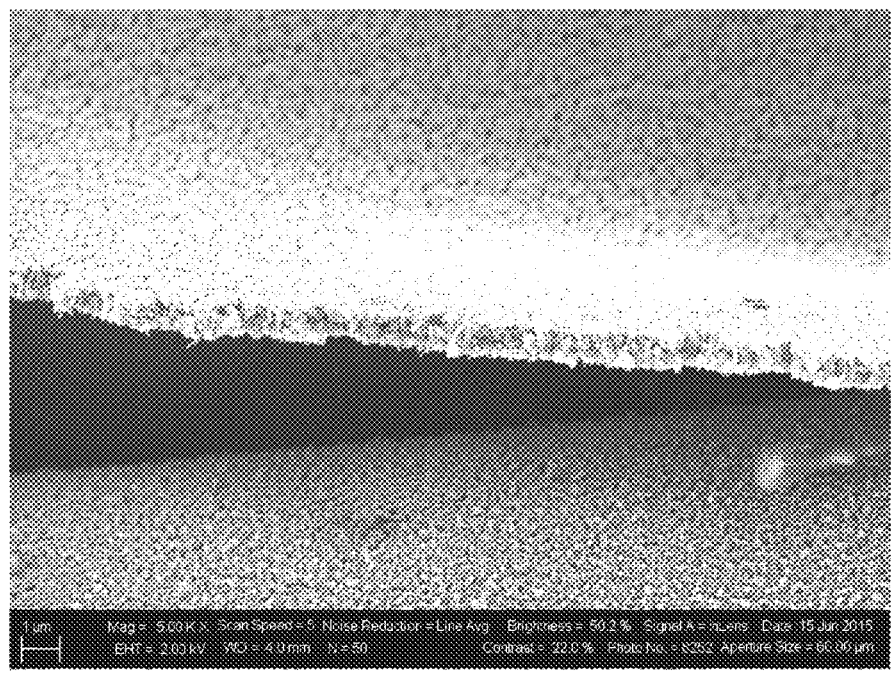
FIG. 25 depicts (a) a scanning electron micrograph and (b) a scanning electron micrograph taken at a high magnification factor than (a) of a sheet-like carbon member following a dealloying step in a method for producing porous graphite of an embodiment of the present invention.
Figure 25:
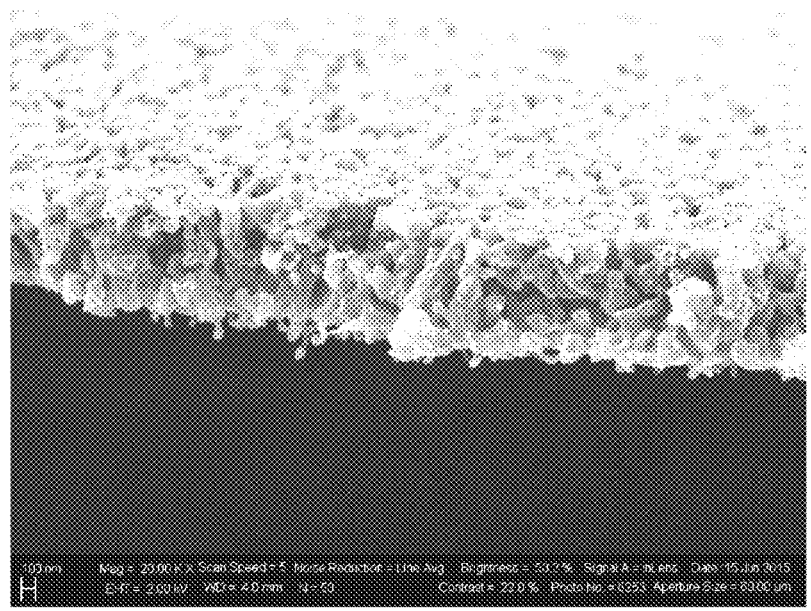
Figure 26:
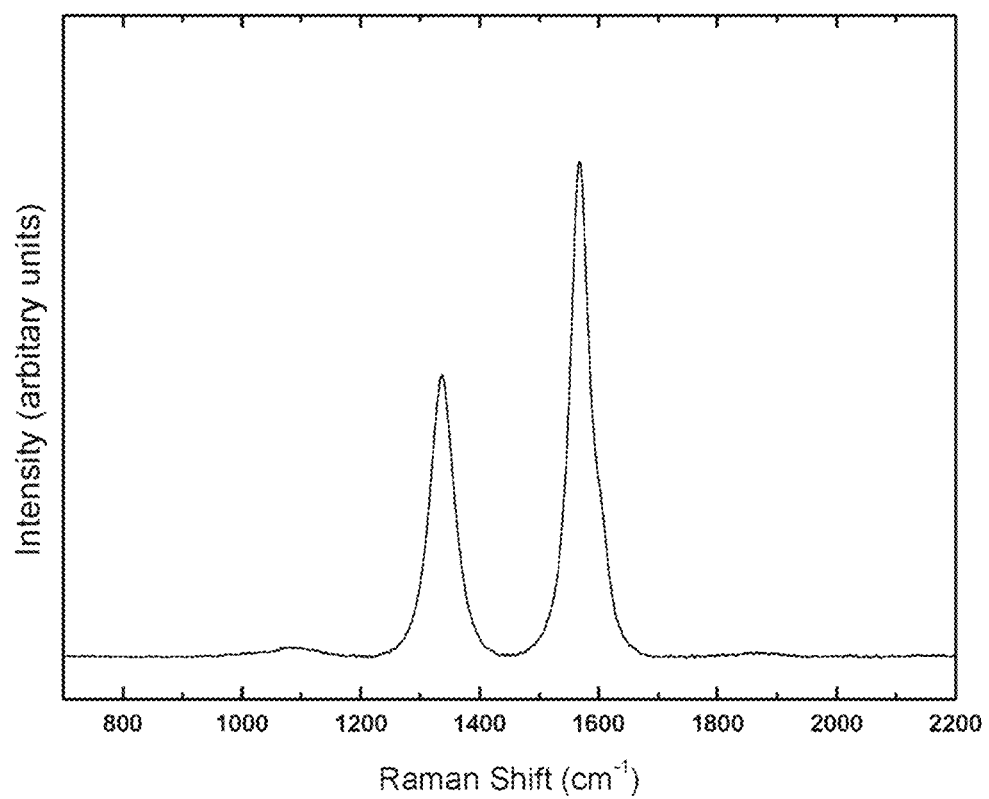
FIG. 26 indicates the Raman spectrum of a sheet-like carbon member following a dealloying step in a method for producing porous graphite of an embodiment of the present invention.

A sheet-like porous graphite was produced. In a first production method, a precursor carbon-containing material in the form of an MnC thin film ($Mn_{85}C_{15}$ thin film) was deposited by sputtering on an Si substrate followed by immersing the Si substrate with the carbon-containing material deposited thereon for 10 minutes in a Bi metal bath at 1100° C. to obtain a sheet-like porous carbon member. Moreover, in order to remove Mn components and Bi components remaining in the periphery and microvoids, the carbon member was immersed for 3 hours in an aqueous nitric acid solution followed by cleaning and drying. A scanning electron micrograph of the sheet-like carbon member obtained in this manner is shown in FIG. 25 while the Raman spectrum thereof is shown in FIG. 26.

In addition, in a second production method, Bi was deposited on an Si substrate followed by further depositing a precursor carbon-containing material in the form of an MnC film ($Mn_{85}C_{15}$ film) by sputtering. This was then heated to 1100° C. and held at that temperature for 10 minutes to promote a dealloying reaction between the Bi and precursor. At this time, the Bi melted and became a metal bath, and Mn was able to be selectively eluted from the carbon-containing material into the metal bath. Following this dealloying step, the Si substrate with the carbon-containing material deposited thereon was cooled, and in order to remove Mn components and Bi components remaining in the periphery and microvoids, the carbon member was immersed for 3 hours in an aqueous nitric acid solution followed by cleaning and drying.

Furthermore, although the precursor MnC thin film was arranged on the Bi thin film, any arrangement may be used provided the MnC thin film is arranged in contact with the molten metal when the Bi is melted, and for example, the MnC thin film may be arranged between the Si substrate and Bi thin film or may be arranged so as to be sandwiched between Bi thin films. In addition, in these two production methods, the thickness of the sheet-like carbon member can be controlled with the thickness of the precursor MnC thin film and the deposition time of the sputtered MnC thin film, while the size can be controlled with the size of the Si substrate and size of the MnC thin film.

As has been indicated in the aforementioned examples, according to the method for producing porous graphite of embodiments of the present invention, porous graphite can be obtained that demonstrates high crystallinity, electrical conductivity and durability, has large specific surface area, and demonstrates large bulk density in bulk. As a result of having large specific surface area, in the case of using in an electrode of various types of batteries and the like, the resulting porous graphite allows the obtaining of high thermal stability, high charge/discharge rate and high output. In addition, due to the high crystallinity and electrical conductivity thereof, the resulting porous graphite also allows the obtaining of high output, high charge/discharge rate and high durability. In addition, due to the large bulk density, the resulting battery is capable of demonstrating high capacity. Sheet-like porous graphite can be used particularly preferably in applications such as the gas diffusion layer of a fuel cell, the current collector and/or negative electrode active material of a lithium ion battery, or the air electrode carrier of various types of air cells.

Furthermore, in the method for producing porous graphite of embodiments of the present invention, the metal bath is not limited to that composed of Ag, Bi, Zn or Cu, but rather the metal bath may be composed of Ga, Ge, Hg, In, Ir, Pb, Pt, Rh, Sb or Sn or a mixture in the form of an alloy having at least one of these elements as a main component thereof. In addition, the other non-carbon main component of the precursor carbon-containing material is not limited to Mn, but rather may be Al, B, Be, Ca, Ce, Cr, Dy, Er, Eu, Fe, Gd, Hf, Ho, K, La, Li, Lu, Mg, Mo, Na, Nb, Nd, Pr, Sc, Se, Si, Sm, Sr, Ta, Ti, V, W or Zr or a mixture containing one or a plurality thereof.

For example, examination of metal baths (melts) suitable for a dealloying step for a representative carbon-containing material (carbide) is thought to include those indicated in Table 4. Table 4 indicates the results of examinations based on their respective two-dimensional phase diagrams.

TABLE 4

| Precursor | Melting Point (° C.) | Melt |
|---|---|---|
| $B_4C$ | 3500 | Cu |
| $Al_4C_3$ | 2100 | Cu, Zn, Ag, Sn, Pb, Bi |
| SiC | 2730 | Cu, Ag |
| $CaC_2$ | 2300 | Cu, Zn, Ag, Pb, Bi |
| TiC | 3170 | Cu, Zn, Ag, Sn, Pb, Bi |
| $Fe_3C$ metastable phase | 1250 | Sn |

BRIEF DESCRIPTION OF THE REFERENCE SYMBOLS

11 Carbon-containing material
12 Metal bath
13 Carbon member
14 Unreacted precursor
15 Aqueous solution

What is claimed is:

1. A method for producing porous graphite, comprising:
    a dealloying step for obtaining a carbon member having microvoids by selectively eluting other non-carbon main components into a molten metal by contacting a carbon-containing material, composed of a compound containing carbon or an alloy or non-equilibrium alloy, with the molten metal, wherein the molten metal has a solidifying point lower than the melting point of the carbon-containing material, and is controlled to a temperature lower than the minimum value of a liquidus temperature within a composition fluctuation range extending from the carbon-containing material to carbon by reducing the other non-carbon main components; and,
    an activation step for subjecting the carbon member obtained in the dealloying step to an activation treatment.

2. The method for producing porous graphite according to claim 1,
    having a graphitization step for graphitizing the carbon member obtained in the dealloying step by heating; wherein,
    activation treatment of the activation step is carried out on the carbon member following graphitization thereof in the graphitization step.

3. The method for producing porous graphite according to claim 2, wherein the graphitization step comprises heating the carbon member to 2000° C. or higher.

4. The method for producing porous graphite according to claim 1, wherein the dealloying step comprises the obtaining of the carbon member by immersing the carbon-containing material in a metal bath composed of the molten metal and selectively eluting the other main components into the metal bath.

5. The method for producing porous graphite according to claim 1,
    having a pretreatment step for preliminarily arranging a solid metal having a solidifying point lower than the melting point of the carbon-containing material so as to contact the carbon-containing material; wherein, the dealloying step allows the obtaining of the carbon member by heating the solid metal to obtain the molten metal and selectively eluting the other main components into the molten metal.

6. The method for producing porous graphite according to claim 1, wherein, the dealloying step selectively elutes and removes only an adhesive mixture containing components of the molten metal and/or the other main components that have adhered to the periphery or inside the microvoids by using an acidic or alkaline aqueous solution after having separated the carbon member from the molten metal.

7. The method for producing porous graphite according to claim 1, wherein the molten metal is composed of Ag, Bi, Cu, Ga, Ge, Hg, In, Ir, Pb, Pt, Rh, Sb, Sn, Zn or a mixture thereof in the form of an alloy having at least one of these components as a main component thereof, and the other main components are composed of Al, B, Be, Ca, Ce, Cr, Dy, Er, Eu, Fe, Gd, Hf, Ho, K, La, Li, Lu, Mg, Mn, Mo, Na, Nb, Nd, Pr, Sc, Se, Si, Sm, Sr, Ta, Ti, V, W, Zr or a mixture containing one or a plurality thereof.

8. The method for producing porous graphite according to claim 1, wherein the dealloying step is carried out in an inert atmosphere or vacuum atmosphere, or is carried out in air after having added flux to the molten metal.

9. The method for producing porous graphite according to claim 1, wherein the porous graphite has a (002) average interplanar spacing as calculated from the (002) diffraction peak of graphite in bulk is 0.342 or less, pores having a size of 2 nm to 100 nm are contained at 80% or more of total pore volume, and BET specific surface area is 100 $m^2/g$ or more.

10. The method for producing porous graphite according to claim 9, wherein the full width at half maximum of the (002) diffraction peak is 1.02° or less and crystallite size is 9 nm or more.

11. The method for producing porous graphite according to claim 9, wherein the ratio $I_D/I_G$ of peak intensity ($I_D$) of the D band to peak intensity ($I_G$) of the G band of the Raman spectrum is 0.5 or less and full width at half maximum in the G band is 45 $cm^{-1}$ or less.

12. The method for producing porous graphite according to claim 9, wherein BET specific surface area is 2400 $m^2/g$ or more.

* * * * *